US012017900B2

(12) United States Patent
Walker

(10) Patent No.: US 12,017,900 B2
(45) Date of Patent: Jun. 25, 2024

(54) COLD BEVERAGE DISPENSER AND POUCH

(71) Applicant: BIBO Barmaid LLC, Clinton, NJ (US)

(72) Inventor: Debra L Walker, Clinton, NJ (US)

(73) Assignee: Bibo Barmaid LLC, Clinton, NJ (US)

( * ) Notice: Subject to any disclaimer, the term of this patent is extended or adjusted under 35 U.S.C. 154(b) by 0 days.

(21) Appl. No.: 17/385,877

(22) Filed: Jul. 26, 2021

(65) Prior Publication Data

US 2022/0055882 A1 Feb. 24, 2022

Related U.S. Application Data

(63) Continuation of application No. 15/640,769, filed on Jul. 3, 2017, now Pat. No. 11,072,521, which is a continuation of application No. 14/806,522, filed on Jul. 22, 2015, now Pat. No. 9,695,030.

(60) Provisional application No. 62/027,286, filed on Jul. 22, 2014.

(51) Int. Cl.

| | |
|---|---|
| ***A47J 31/00*** | (2006.01) |
| ***B67D 1/00*** | (2006.01) |
| ***B67D 1/06*** | (2006.01) |
| ***B67D 1/08*** | (2006.01) |
| ***B67D 3/00*** | (2006.01) |
| *B67B 7/00* | (2006.01) |

(52) U.S. Cl.

CPC ......... *B67D 1/0041* (2013.01); *B67D 1/0001* (2013.01); *B67D 1/0021* (2013.01); *B67D 1/003* (2013.01); *B67D 1/0047* (2013.01); *B67D 1/0078* (2013.01); *B67D 1/0079* (2013.01); *B67D 1/06* (2013.01); *B67D 1/0888* (2013.01); *B67D 3/0012* (2013.01); *B67B 7/24* (2013.01); *B67D 1/0046* (2013.01); *B67D 1/0857* (2013.01); *B67D 1/0872* (2013.01); *B67D 3/0096* (2013.01)

(58) Field of Classification Search

CPC .. B67D 1/0041; B67D 1/0001; B67D 1/0021; B67D 1/003; B67D 1/0047; B67D 1/0078; B67D 1/0079; B67D 1/06; B67D 1/0888; B67D 1/0046; B67D 1/0857; B67D 1/0872; B67D 3/0012; B67D 3/0096; B67D 7/24

See application file for complete search history.

(56) References Cited

U.S. PATENT DOCUMENTS

| | | | | |
|---|---|---|---|---|
| 2,103,389 A * | 12/1937 | Salfisberg | B65D 75/5822 | 426/115 |
| 2,635,788 A * | 4/1953 | Snyder | B65D 75/48 | 383/905 |
| 2,663,461 A * | 12/1953 | Brown | B65D 75/48 | 206/820 |
| 3,009,498 A * | 11/1961 | Fohr | B65D 31/145 | 383/44 |

(Continued)

*Primary Examiner* — Nicolas A Arnett

(74) *Attorney, Agent, or Firm* — Cooper & Maersch LLC; Lorri W. Cooper

(57) ABSTRACT

A pouch for use in a beverage dispenser is a soft pouch having a liquid or slurry contents stored in a compartment thereof. The pouch has a front panel, a rear panel, and a base panel. The front and rear panels are joined together by a common seal around their side edges and an upper edge thereof. An upper portion of the pouch has a top edge, upper side edges and rounded shoulders that are connected to the side edges of the front and rear panels. The top edge has a width that is narrower than the pouch width. The pouch is formed of a laminated material.

19 Claims, 19 Drawing Sheets

(56) References Cited

U.S. PATENT DOCUMENTS

| | | | | | |
|---|---|---|---|---|---|
| 3,186,625 | A * | 6/1965 | McAd | B65D 85/80 | 383/41 |
| 3,199,437 | A * | 8/1965 | Nelsen | B65D 85/816 | 426/77 |
| 3,429,495 | A * | 2/1969 | McClosky | B65D 75/20 | 206/820 |
| 4,171,755 | A * | 10/1979 | Carlisle | B65D 75/48 | 206/390 |
| 4,463,876 | A * | 8/1984 | Swallert | A47K 5/1215 | 222/105 |
| 4,759,472 | A * | 7/1988 | Strenger | B65D 75/5822 | 383/210 |
| 4,808,346 | A * | 2/1989 | Strenger | B67D 1/0036 | 261/DIG. 7 |
| D304,299 | S * | 10/1989 | Sakamoto | D9/707 | |
| D306,555 | S * | 3/1990 | Lane | D9/707 | |
| 4,915,261 | A * | 4/1990 | Strenger | A47J 31/407 | 222/107 |
| D309,432 | S * | 7/1990 | Mancini | D9/707 | |
| 4,981,374 | A * | 1/1991 | Rutter | B65B 9/13 | 383/207 |
| D319,976 | S * | 9/1991 | Wortley | D9/707 | |
| 5,067,635 | A * | 11/1991 | Thomsen | B65D 35/40 | 222/491 |
| D351,992 | S * | 11/1994 | Jacques | D9/696 | |
| D354,906 | S * | 1/1995 | Lane, Jr. | D24/118 | |
| 5,497,913 | A * | 3/1996 | Baker | A61C 9/0026 | 222/541.6 |
| D392,559 | S * | 3/1998 | Smith | D9/710 | |
| 6,076,968 | A * | 6/2000 | Smith | B65D 75/58 | 383/44 |
| 6,079,315 | A * | 6/2000 | Beaulieu | A47J 31/4467 | 99/302 R |
| 6,116,782 | A * | 9/2000 | Arkins | B65D 75/008 | 493/212 |
| 6,155,457 | A * | 12/2000 | Landa | G03G 15/104 | 222/327 |
| 6,164,825 | A * | 12/2000 | Larkin | B65D 75/008 | 383/44 |
| D442,078 | S * | 5/2001 | Fuquen | D9/696 | |
| D452,144 | S * | 12/2001 | Tedeschi, Jr. | D9/707 | |
| D455,645 | S * | 4/2002 | Bell | D9/710 | |
| D463,974 | S * | 10/2002 | Berman | D9/707 | |
| 6,606,938 | B2 * | 8/2003 | Taylor | A47J 31/32 | 426/77 |
| 6,607,762 | B2 * | 8/2003 | Lazaris | B65D 85/8061 | 206/0.5 |
| 6,655,260 | B2 * | 12/2003 | Lazaris | A47J 31/4492 | 99/302 R |
| D484,972 | S * | 1/2004 | Steele, IV | D9/707 | |
| D501,399 | S * | 2/2005 | Tobolka | D9/434 | |
| 6,935,781 | B2 * | 8/2005 | Makino | B65D 77/06 | 383/906 |
| D509,751 | S * | 9/2005 | Risgalla | D9/707 | |
| D523,758 | S * | 6/2006 | Risgalla | D9/707 | |
| 7,055,683 | B2 * | 6/2006 | Bourque | B29C 65/76 | 604/416 |
| D533,462 | S * | 12/2006 | Bachmann | D9/695 | |
| 7,165,488 | B2 * | 1/2007 | Bragg | A47J 31/3676 | 99/302 R |
| D545,689 | S * | 7/2007 | Peel | D9/707 | |
| D550,568 | S * | 9/2007 | Lau | D9/707 | |
| D555,010 | S * | 11/2007 | Maier | D9/707 | |
| 7,306,095 | B1 * | 12/2007 | Bourque | B29C 65/76 | 604/416 |
| D558,594 | S * | 1/2008 | Kirou | D9/708 | |
| 7,347,138 | B2 * | 3/2008 | Bragg | A47J 31/3676 | 99/289 R |
| 7,360,418 | B2 * | 4/2008 | Pelovitz | A47J 31/4457 | 73/304 C |
| 7,377,162 | B2 * | 5/2008 | Lazaris | A47J 31/4457 | 222/51 |
| 7,398,726 | B2 * | 7/2008 | Streeter | A47J 31/56 | 99/305 |
| D578,010 | S * | 10/2008 | Friedland | D9/707 | |
| D578,011 | S * | 10/2008 | Friedland | D9/707 | |
| D578,016 | S * | 10/2008 | Friedland | D9/707 | |
| D578,017 | S * | 10/2008 | Friedland | D9/707 | |
| D578,018 | S * | 10/2008 | Friedland | D9/707 | |
| D578,019 | S * | 10/2008 | Friedland | D9/707 | |
| D580,780 | S * | 11/2008 | Kelly | D9/707 | |
| D580,782 | S * | 11/2008 | Murray | D9/707 | |
| D585,302 | S * | 1/2009 | Beyer | D9/707 | |
| D586,231 | S * | 2/2009 | Friedland | D9/707 | |
| D587,597 | S * | 3/2009 | Friedland | D9/707 | |
| 7,513,192 | B2 * | 4/2009 | Sullivan | A47J 31/3695 | 99/302 R |
| D595,592 | S * | 7/2009 | Beyer | D9/707 | |
| D601,037 | S * | 9/2009 | Beyer | D9/707 | |
| 7,640,845 | B2 * | 1/2010 | Woodnorth | A47J 31/54 | 99/302 R |
| D610,467 | S * | 2/2010 | Kozarsky | D9/707 | |
| D613,181 | S * | 4/2010 | Friedland | D9/707 | |
| D623,536 | S * | 9/2010 | Bohmke | D9/707 | |
| D627,236 | S * | 11/2010 | Kozarsky | D9/707 | |
| 7,950,850 | B2 * | 5/2011 | Fukuizumi | B65D 75/5883 | 383/120 |
| D640,566 | S * | 6/2011 | Norlin | D9/707 | |
| D643,745 | S * | 8/2011 | Hartley | D9/707 | |
| 8,091,735 | B2 * | 1/2012 | Girard | B01F 33/848 | 222/509 |
| 8,104,642 | B2 * | 1/2012 | Bambrick | B67D 3/0061 | 222/137 |
| 8,151,694 | B2 * | 4/2012 | Jacobs | A47J 31/469 | 99/302 C |
| D668,554 | S * | 10/2012 | Tsuchiya | D9/707 | |
| 8,361,527 | B2 * | 1/2013 | Winkler | A47J 31/3695 | 426/77 |
| D676,335 | S * | 2/2013 | Murray | D9/707 | |
| D676,336 | S * | 2/2013 | Murray | D9/707 | |
| 8,481,097 | B2 * | 7/2013 | Skalski | A47J 31/369 | 426/77 |
| 8,495,949 | B2 * | 7/2013 | Tinkler | A47J 31/3676 | 99/305 |
| 8,516,948 | B2 * | 8/2013 | Zimmerman | A47J 31/32 | 99/302 R |
| D689,371 | S * | 9/2013 | Ross | D9/707 | |
| D689,776 | S * | 9/2013 | Murray | D9/707 | |
| D692,315 | S * | 10/2013 | Bohmke | D9/707 | |
| D692,316 | S * | 10/2013 | Bohmke | D9/707 | |
| D693,241 | S * | 11/2013 | Kilber | D9/707 | |
| 8,573,114 | B2 * | 11/2013 | Huang | A47J 31/32 | 99/302 R |
| 8,590,753 | B2 * | 11/2013 | Marina | B67D 3/0019 | 222/129 |
| D695,132 | S * | 12/2013 | Bouthillon | D9/707 | |
| 8,609,170 | B2 * | 12/2013 | Tinkler | A47J 31/3676 | 426/433 |
| D698,663 | S * | 2/2014 | Lin | D9/707 | |
| D700,066 | S * | 2/2014 | Berman | D9/707 | |
| 8,667,892 | B2 * | 3/2014 | Cominelli | A23F 5/262 | 99/301 |
| 8,673,379 | B2 * | 3/2014 | Skalski | A47J 31/369 | 426/115 |
| D703,549 | S * | 4/2014 | Murray | D9/707 | |
| 8,708,195 | B1 * | 4/2014 | Duran | B65D 75/52 | 222/153.05 |
| 8,740,020 | B2 * | 6/2014 | Marina | B67D 3/0058 | 222/129 |
| 8,757,222 | B2 * | 6/2014 | Rudick | G07F 9/009 | 141/94 |
| 8,808,775 | B2 * | 8/2014 | Novak | A47J 31/407 | 261/DIG. 7 |
| 8,881,948 | B1 * | 11/2014 | Lassota | A47J 31/40 | 99/290 |
| D723,385 | S * | 3/2015 | Gaudard | D9/707 | |
| 8,985,395 | B2 * | 3/2015 | Tansey | G06Q 30/0269 | 222/146.6 |
| 9,061,819 | B2 * | 6/2015 | Kane, Jr. | B65D 81/3266 | |

(56) References Cited

U.S. PATENT DOCUMENTS

| | | | | | |
|---|---|---|---|---|---|
| D736,099 | S * | 8/2015 | Deuerer | D9/707 | |
| 9,365,405 | B2 * | 6/2016 | Stratton | B67D 1/0021 | |
| 9,701,527 | B2 * | 7/2017 | Tansey, Jr. | B67D 1/0071 | |
| 9,783,403 | B2 * | 10/2017 | Tansey, Jr. | B67D 1/0015 | |
| 9,809,437 | B2 * | 11/2017 | Tansey, Jr. | B67D 1/0051 | |
| 10,414,642 | B2 * | 9/2019 | Melville, Jr. | B67D 1/0021 | |
| 2004/0007588 | A1 * | 1/2004 | Danby | B65B 37/20 | 222/94 |
| 2004/0118710 | A1 * | 6/2004 | Bourque | B65D 75/563 | 206/219 |
| 2004/0161177 | A1 * | 8/2004 | N'Dia | B65D 75/58 | 383/104 |
| 2005/0109796 | A1 * | 5/2005 | Bourque | B65D 75/008 | 222/129 |
| 2006/0118581 | A1 * | 6/2006 | Clark | B67D 1/0041 | 222/333 |
| 2008/0010950 | A1 * | 1/2008 | Peck | B65D 75/48 | 383/35 |
| 2008/0314927 | A1 * | 12/2008 | Martin | B67D 3/0067 | 222/129 |
| 2009/0057340 | A1 * | 3/2009 | Moothart | B67D 3/0029 | 222/113 |
| 2009/0120961 | A1 * | 5/2009 | Dietschi | B67D 1/04 | 62/3.2 |
| 2010/0116842 | A1 * | 5/2010 | Hecht | A47J 31/52 | 222/144.5 |
| 2010/0154919 | A1 * | 6/2010 | Jansen | B67C 3/02 | 220/4.28 |
| 2010/0269707 | A1 * | 10/2010 | Wiemer | B67D 1/0021 | 99/323.1 |
| 2011/0166910 | A1 * | 7/2011 | Marina | B65D 41/50 | 705/7.29 |
| 2011/0226343 | A1 * | 9/2011 | Novak | B01F 23/2362 | 99/323.2 |
| 2012/0183657 | A1 * | 7/2012 | Marina | B65D 81/3222 | 215/6 |
| 2013/0015206 | A1 * | 1/2013 | van Haperen | B67D 3/0038 | 29/401.1 |
| 2013/0042941 | A1 * | 2/2013 | van Haperen | B67D 3/0009 | 141/82 |
| 2013/0062366 | A1 * | 3/2013 | Tansey | B67D 1/0809 | 222/101 |
| 2013/0077898 | A1 * | 3/2013 | Doll | B65D 75/58 | 493/212 |
| 2013/0233180 | A1 * | 9/2013 | Belmont | B01F 23/2361 | 99/323.2 |
| 2014/0069953 | A1 * | 3/2014 | Metropulos | B67D 1/0041 | 222/129.1 |
| 2014/0072678 | A1 * | 3/2014 | Jenkins | B65D 85/804 | 426/115 |
| 2014/0106048 | A1 * | 4/2014 | Harper | C12G 3/04 | 426/573 |
| 2014/0114469 | A1 * | 4/2014 | Givens | B67D 1/0041 | 222/23 |
| 2014/0134299 | A1 * | 5/2014 | Guidorzi | A23G 9/045 | 222/30 |
| 2014/0175125 | A1 * | 6/2014 | Breault | B67D 1/0078 | 222/129.1 |
| 2014/0209634 | A1 * | 7/2014 | Metropulos | B67D 1/0041 | 222/608 |
| 2014/0224130 | A1 * | 8/2014 | Castellani | A47J 31/4492 | 426/77 |
| 2014/0263407 | A1 * | 9/2014 | Rudick | B67D 3/0012 | 137/511 |
| 2014/0263414 | A1 * | 9/2014 | San Miguel | A23G 9/12 | 222/1 |
| 2014/0372233 | A1 * | 12/2014 | Knecht | G06Q 50/12 | 705/15 |
| 2015/0125586 | A1 * | 5/2015 | Ergican | A47J 31/46 | 99/295 |
| 2015/0151956 | A1 * | 6/2015 | Tansey | B67D 1/0079 | 222/82 |
| 2015/0175400 | A1 * | 6/2015 | Newman | B67D 1/0878 | 222/1 |
| 2015/0183627 | A1 * | 7/2015 | Tansey, Jr. | B67D 1/0078 | 222/190 |
| 2015/0217986 | A1 * | 8/2015 | Tansey, Jr. | G06Q 30/0269 | 222/102 |
| 2015/0307248 | A1 * | 10/2015 | Patwardhan | B65D 77/04 | 24/499 |
| 2016/0023879 | A1 * | 1/2016 | Walker | B67D 1/0078 | 141/105 |
| 2016/0251208 | A1 * | 9/2016 | Tansey, Jr. | B67D 1/0801 | 222/95 |
| 2016/0325976 | A1 * | 11/2016 | Guy | B67D 1/0001 | |
| 2016/0376139 | A1 * | 12/2016 | Melville, Jr. | B65D 85/804 | 222/1 |
| 2016/0376140 | A1 * | 12/2016 | Tansey, Jr. | A47J 31/44 | 700/236 |
| 2017/0253402 | A1 * | 9/2017 | Melville, Jr. | B65D 75/5811 | |

* cited by examiner 14
16
18
24
42
46
48
50
60

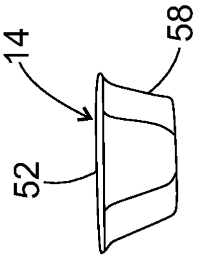
Fig. 6B
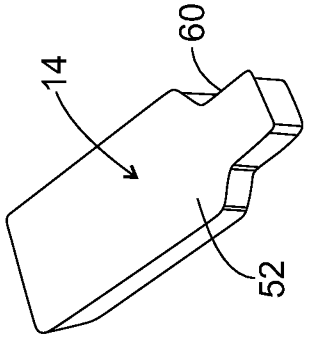
Fig. 6A
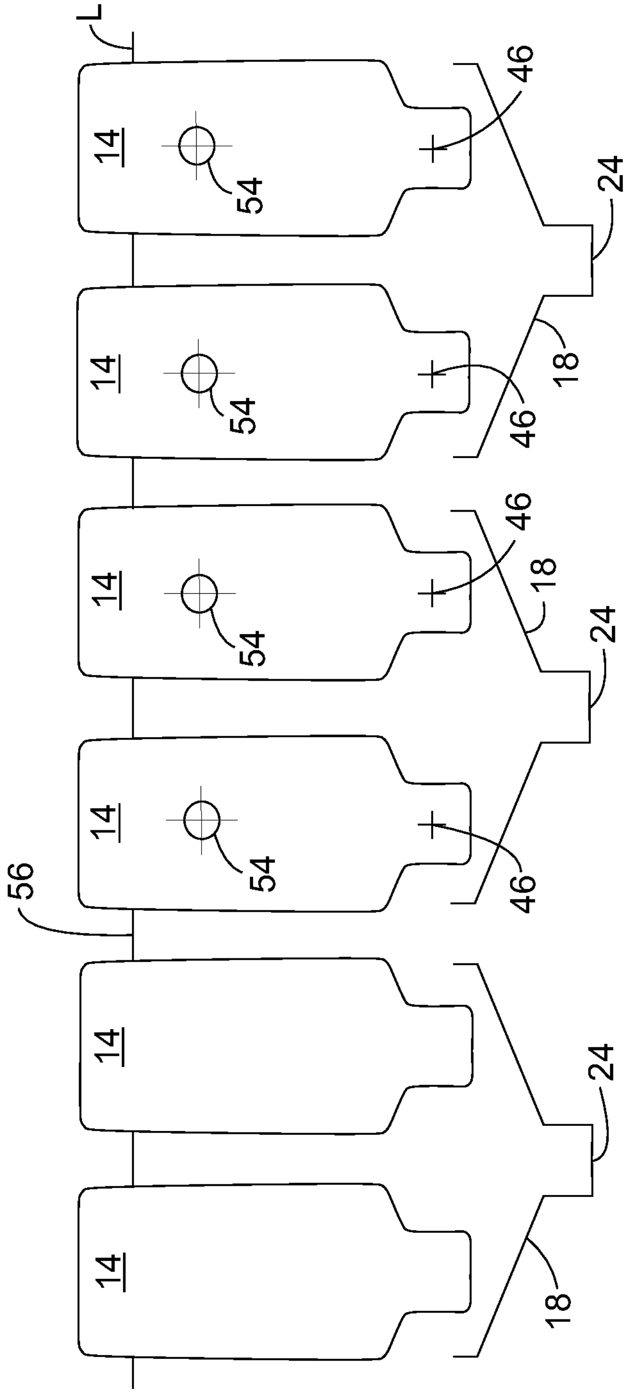
Fig. 5C
Fig. 5A
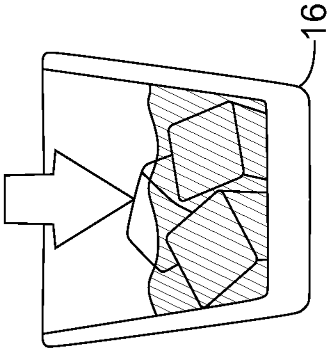
Fig. 5B

COLD BEVERAGE DISPENSER AND POUCH

CROSS-REFERENCE TO RELATED APPLICATION

This application claims priority to U.S. Provisional application No. 62/027,286, filed on Jul. 22, 2014, is a continuation of U.S. patent application Ser. No. 14/806,522, filed on Jul. 22, 2015, now U.S. Pat. No. 9,695,030, which issued on Jul. 4, 2017, and is a continuation of U.S. patent application Ser. No. 1/640,769, filed on Jul. 3, 2017, now U.S. Pat. No. 11,072,521, which issued on Jul. 27, 2021, the disclosures of which are incorporated herein by reference in their entireties.

FIELD

The examples described herein relate to a cold beverage dispenser and a pouch for use in making mixed drinks and/or health and wellness drinks.

BACKGROUND

Many consumers enjoy trying different alcoholic beverages. Often, to try multiple types of beverages, it is necessary to purchase a multitude of ingredients and multiple bottles of alcohol. This is often very costly and requires a significant amount of storage since bottle are often not emptied and need to be stored. Because of this, consumers tend to stick with a certain type of drink. Countertop coffee makers have become very popular among consumers. These countertop coffee makers include a brewer which heats water from a reservoir and inputs hot water to a single serve container that houses coffee grinds and a filter. Coffee is "brewed" in the container and then permitted to exit the brewer into a cup.

SUMMARY

A cold beverage dispenser and pouch is shown and described.

BRIEF DESCRIPTION OF THE DRAWINGS

FIG. 5A depicts a schematic of dispensing according to FIG. 2B or 2E representing positioning the containers in the dispensing device;

FIG. 5B depicts a schematic of dispensing that occurs after FIG. 5A that involves piercing or opening the containers and dispending the ingredients into a glass:

FIG. 5C depicts a schematic of dispensing that occurs after FIG. 5B representing removing the containers from the dispensing machine;

FIG. 6A depicts a perspective view of a second example container in the form of a thermoformed pack that is sealed with a foil cover;

FIG. 6B depicts an end view of the thermoformed pack of FIG. 6A;

DETAILED DESCRIPTION

Figure 1:
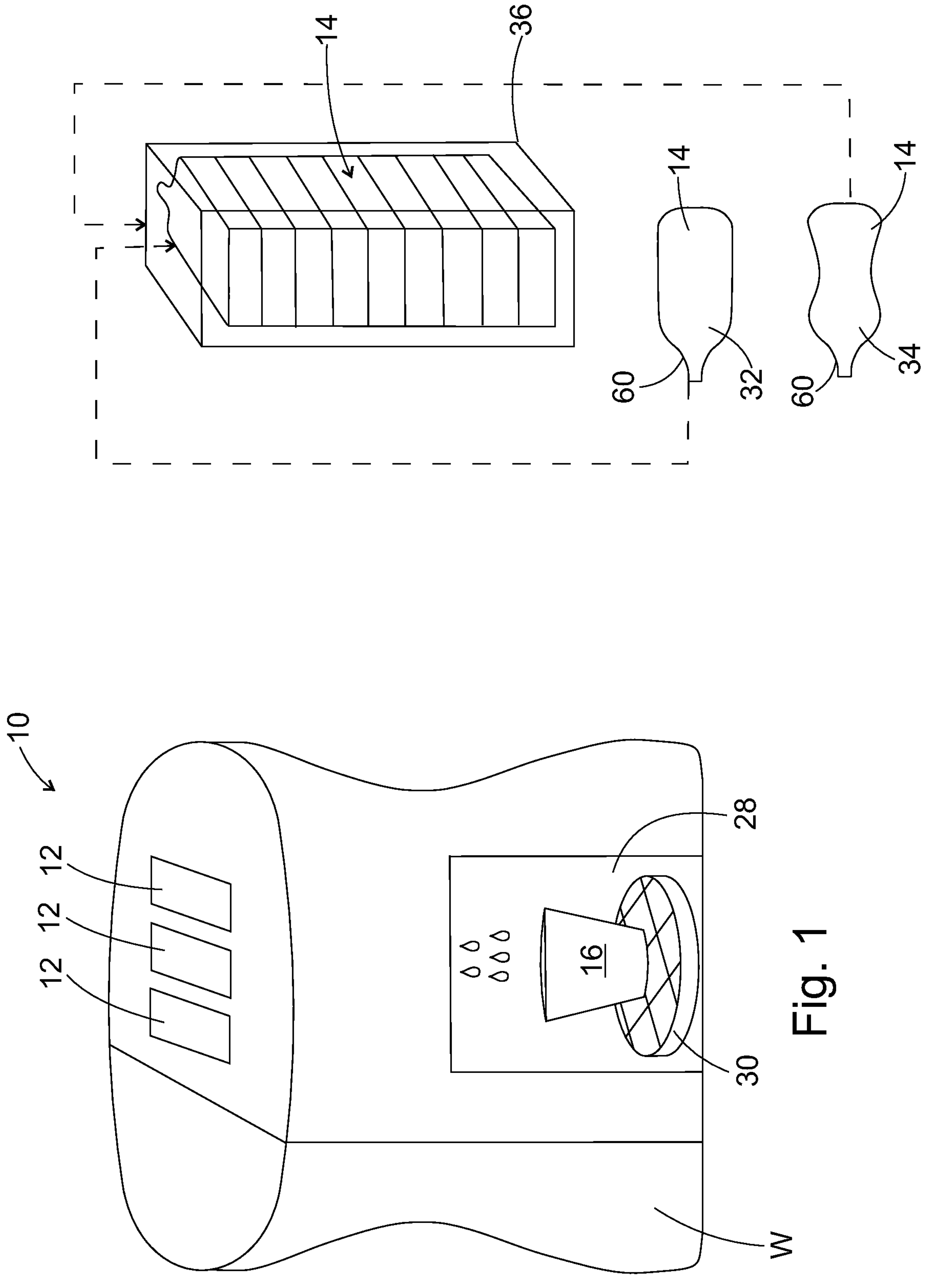
FIG. 1 shows an example beverage maker according to the invention, as well as a depiction of a beverage cartridge/container.

Consumers enjoy trying mixed drinks. Drink specialty menus are very popular at most restaurants. However, specialty drinks are often expensive to purchase. Consumers often would like to try specialty drinks at home, but it can be costly to purchase all the ingredients. In addition, consumers need to find recipes on their own. The cold beverage dispenser 10 described herein provides a solution for consumers to be able to make many different kinds of drinks, including specialty drinks, without having to find a recipe and mix various ingredients together. The example dispenser described herein allows a consumer to make a "perfect" drink every time without having to buy multiple bottles of ingredients and alcohol.

In one example, the device 10 is an on-the-counter machine targeted to the casual cocktail market for people who want to try a variety of drinks, but don't necessarily want to invest in large amounts of expensive ingredients. In this example, the machine 10 is single-serve and permits a consumer to mix a wide variety of ingredients together to make a cocktail. The machine 10 has between 2 and 4 receptacles 12 for receiving ingredient containers 14, as well as a reservoir W for holding water. The receptacles 12 are configured to accept single serve containers 14 that include liquid ingredients. Alternatively, the containers 14 could hold powder ingredients. By utilizing multiple containers 14 in multiple receptacles 12, the consumer has the ability to create hundreds of cocktails. The containers 14 may include cocktail mixers (such as juice and other ingredients) or alcohol products (such as vodka, gin, whiskey, and the like). A typical cocktail can be made using one alcohol container 14 and one mixer container 14. The containers 14 are input separately into the receptacles 12 in the dispensing machine 10 and the alcohol is typically not mixed with the mixers prior to activation of the dispensing machine 10, although there may be some formulations where alcohol is mixed with a mixer in the container 14. The size of the containers 14 may vary relative to the alcohol pouches and relative to what is required to make a drink recipe. Although an initial embodiment of the beverage maker 10 is an on the counter-type device, the device 10 may alternatively be an on-the-floor device or have different sizes depending upon the application.

The containers 14 are formulated so that they allow the consumer to make the "perfect" drink every time because the mixers are proportioned to exactly match the amount of alcohol in the alcohol container 14. This allows the consumer great ease to try a variety of drinks, mixed perfectly, in their own home. No measuring of ingredients is needed. The consumer only has to insert the containers 14 into the receptacles 12 and let the machine 10 prepare the cocktail.

The Alcohol and Tobacco Tax and Trade Bureau (TTB) regulates the labeling, advertising, and marketing of alcoholic beverages in the United States. Wine and liquor may only be sold in standard sizes. The smallest size bottle of distilled spirits permitted to be sold in the United States is referred to as a miniature and has a size of 50 ml or 1.7 ounces. A typical shot that is dispensed in US bars is between 1 ounce and 1.5 ounces. The "shot" dispensed in connection with the subject dispenser 10 is 1.7 ounces to conform to US sizing standards. This may change over time if federal regulations change. Other sizes may be used in other jurisdictions, with the size of the "shot" not being limited to 50 ml. The mixers utilized with the dispensing device 10 are formulated for use with 1.7 ounces of liquor. If a different size "shot" is permitted to be sold, then the mixers can be adjusted based upon the quantity of alcohol in the "shot" container. Double shots of alcohol may be used by either using a larger container 14 in the receptacle 12 or by using two alcohol containers 14, each having 1.7 ounces of alcohol. In one example, the dispenser 10 may have the capacity to make a "double" so that 3 ounces of alcohol are used at minimum, along with about 8 oz. of mixer. Alcohol may be dispensed as a precisely measured mixologist bartender shot, if desired and permitted under local laws.

The example drink dispenser 10 takes multiple containers 14 of material, adds water and dispenses them into a cup 16. The device 10 may include a funnel 18, mixing chamber 20, or, alternatively, the ingredients may simply flow directly into an underlying cup 16. A funnel 18 may be used to direct the ingredients into the underlying cup 16 while a mixing reservoir 20 will typically have a valve 22 positioned at its outlet to allow mixing of ingredients in the mixing reservoir 20 before the valve 22 is opened. Both the funnel 18 and the mixing chamber 20 have an outlet 24 through which the combined ingredients may exit the mixing chamber 20 or funnel. When a mixing chamber 20 is utilized, swirling motion created by the input of water may permit the ingredients to mix.

In yet another embodiment, a motorized blender (not shown) may be utilized to receive the ingredients and water in place of the mixing reservoir 20 so that the ingredients can be blended together before being dispensed into a cup 16. The blender may have an outlet 24 that is closed and opened by a valve 22 to permit blending in the blender before dispensing.

The dispensing device 10 may alternatively be used to make health drinks, such as those that include nutritional supplements or other "health food" related components. One type of ingredient may be a mixture of vitamins in a concentrated liquid form, which are known to be more readily absorbed by the body. Alternatively, a powder-based mix may be used, with water from a water supply W being used to make the mixture flow through the system 10. Other types of health enhancing products may be used including vitamins, minerals, and other nutrients or products, as known by those of skill in the art. Pureed fruits and vegetables may be utilized to incorporate fruits and vegetables, if desired. For example, a kale-based container 14 could be used along with a mango-based container 14 along with a supplement container 14. Juices may be used. This permits the user to customize their "health" drink to find a drink mixture that they enjoy.

The device 10 may have a refrigeration component or chiller (not shown) and may include an ice dispenser (not shown). Alternatively, ice may be added to the cup or glass 16 before or after the liquid mixture is dispensed into the cup/glass 16. The liquid mixture may also be dispensed into other types of receptacles, such as pitchers or mugs, for example (not shown). A chiller could be used to chill the water or the ingredients in the containers 14.

An exterior view of an example dispensing device 10 is shown in FIG. 1. The example dispensing device 10 has a reservoir for holding water W. Three receptacles 12 are shown positioned on a top surface 26 of the dispensing device 10. An opening 28 is shown in the side of the device 10 for accepting a cup 16 and a drip tray 30. Liquid is dispensed from the interior of the device 10 into the cup 16. FIG. 1 also shows two possible container shapes, one of which is bottle shaped 32 and the other of which is hourglass shaped 34. The container 14 may be stored in a box or other storage device 36, such as a clear plastic storage box, among other known storage devices 36. While not shown, the storage device 36 may include a slot along the side that permits the user to easily remove containers 14 from the storage device 36. Container 14 may enter the storage device 36 via an opening in the top, as one example. Other examples are readily known by those of skill in the art.

FIGS. 2A-2E represent different possible variations for dispensing from the containers 14 and water introduction into the system 10. The examples presented are non-exhaustive. Other variations are also possible and would be recognized by those of skill in the art. The dispensing device 10 has a water reservoir W or other water source. A fluid line 38 is coupled to the water reservoir W and a pump P. The fluid line 38 communicates with the containers 14 to mix water with the ingredients of the containers 14. Two containers 14 are shown, but more than two containers 14 may be used if desired.

FIGS. 2A-2C and 2E represent a direct deposit method of depositing the liquid into a cup 16 16. In these embodiments, liquid enters a funnel shaped member 18 and is deposited directly into the cup 16 that is positioned under an opening 24 in the bottom of the funnel 18. While a funnel shape is shown, other shapes may be used as long as they permit all the liquid to travel out of the dispensing device 10 and provide a function of a funnel. A controller C is shown coupled to the pump P to regulate the flow of water from the pump P to the funnel 18 or to the containers 14. A controller C could also be used for opening and closing valves 22, or for moving an opening mechanism 40, such as a piercer into position, among other functions.

Figures 2A, 2B, 2C:
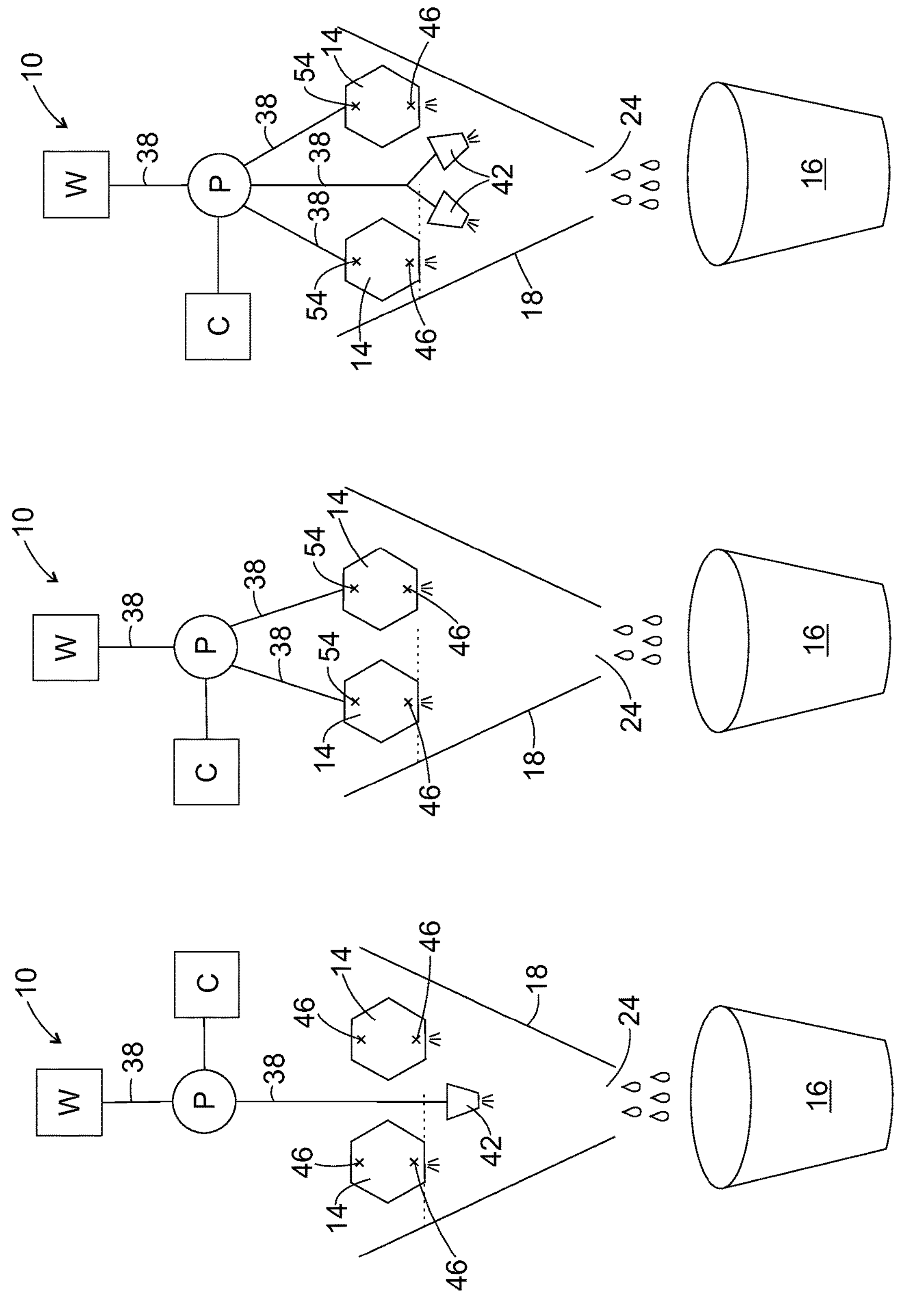
FIG. 2*a* depicts a schematic of a first example dispenser according to the invention.
FIG. 2*b* depicts a schematic of a second example dispenser according to the invention.
FIG. 2*c* depicts a schematic of a first example dispenser according to the invention.

FIG. 2A depicts a system 10 where the liquid in the containers 14 flows from the containers 14 into the funnel 18 while liquid from the water source W is pumped via the pump P into the funnel 18. The water can be directed in any manner desired, such as in a swirling pattern to assist in cleaning the funnel 18. Water may be sprayed through a nozzle 42, if desired, or may simply be deposited from a water line 38. Liquid can exit the containers 14 by gravity or squeezing.

FIG. 2B is similar to FIG. 2A except the water from the pump P is directed into the containers 14 to wash the interior of the containers 14 so that all liquid exits the containers 14 and flows into the funnel 18.

FIG. 2C is similar to FIGS. 2A and 2B. Water flows from the water source W though both containers 14 and through nozzles 42 that are positioned in the funnel 18 to wash the funnel 18 before the liquid enters the cup 16.

Figure 2E:
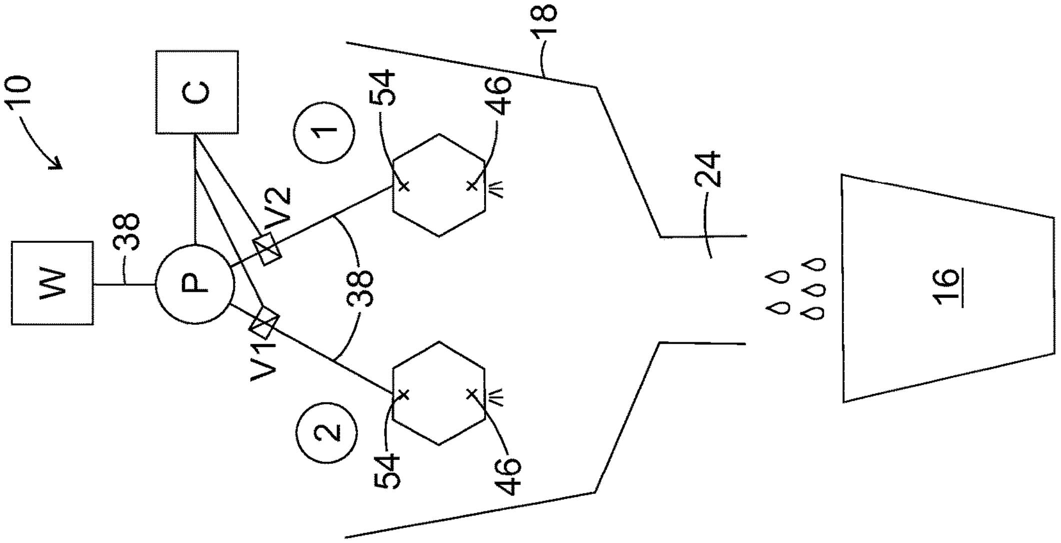
FIG. 2*e* depicts a schematic of a first example dispenser according to the invention.
Figure 2D:
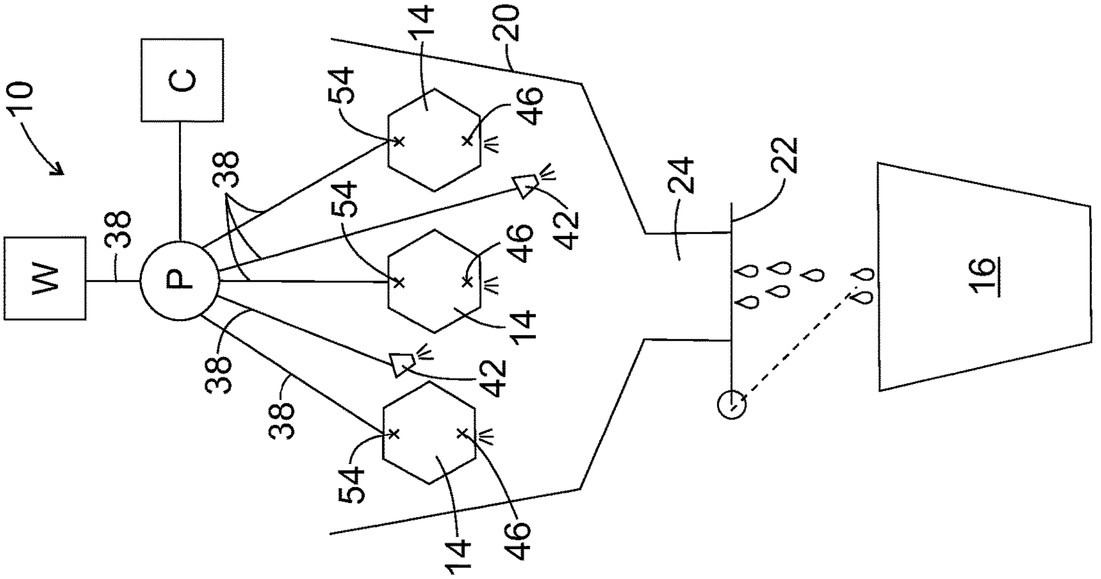
FIG. 2*d* depicts a schematic of a first example dispenser according to the invention.

FIG. 2D depicts an alternative embodiment that has three containers 14. The containers 14 communicate with the water source W to receive water into each of the containers 14. In addition, the pump P pumps water into the reservoir 20. As shown, the water is ejected from nozzles 42 at different locations within the reservoir 20. In this embodiment, a closed reservoir 20 is utilized to permit mixing of ingredients before the ingredients are deposited in a cup 16. A valve 22 is positioned at the opening of the reservoir 20. After all the liquid has entered the reservoir 20, the valve 22 opens to permit the ingredients and water to flow into the cup 16. The reservoir 20 could alternatively be a blender or mixer.

FIG. 2E is similar to FIG. 2B but involves sequencing of the water flow to allow water to first flow through container No. 1 14, which has the cocktail mixer, and then to flow through container No. 2 14, which has the alcohol product. This permits the alcohol to wash the interior of the funnel 18 on its way out. Valves 22 may be utilized in the fluid lines 38 to open and close the lines during the sequencing. Alternatively, the pump P can include valves for allowing water to pass through one line at a time. Other techniques are known for sequencing and could be utilized, as well.

FIGS. 3A-3D depict the use of a container 14 in the form of an aseptic bag or lamination pouch that is used to hold the ingredients. This type of bag is readily known in the packaging industry and is used for such things as juice boxes and other liquids. A first container 14 holds the alcohol and a second container 14 holds the cocktail mixer. While not shown, the containers 14 will be positioned in a receptacle 12 in FIG. 3A. The containers 14 shown are bottle shaped and the neck of the bottle is shown facing downwardly when installed in the receptacle 12. Other shapes could be utilized. For example, a shape that is not direction specific could be used, if desired, such as a round, oval, rectangular, or other shaped pouch.

Figures 3A, 3B, 3C, 3D, 4A, 4B:
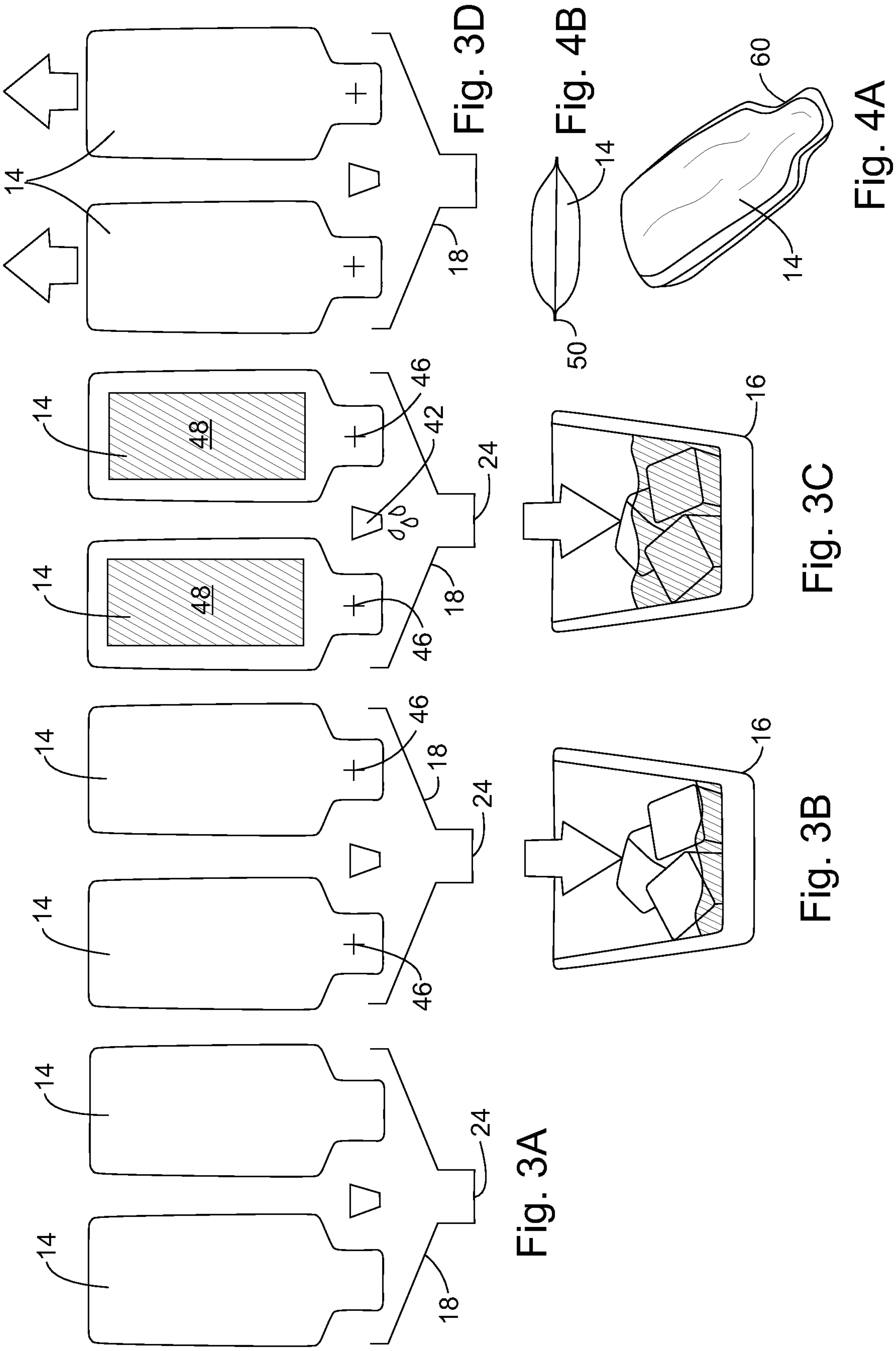
FIG. 3A depicts a schematic of dispensing according to FIG. 2A, 2C or 2E representing positioning the containers in the dispensing device.
FIG. 3B depicts a schematic of dispensing that occurs after FIG. 3A that involves piercing or opening the containers.
FIG. 3C depicts a schematic of dispensing that occurs after FIG. 3B representing dispensing the ingredients into a glass.
FIG. 3D depicts a schematic of dispensing that occurs after FIG. 3C representing removing the containers from the dispensing machine.
FIG. 4A depicts a perspective view of a first example container in the form of a flexible pack.
FIG. 4B depicts an end view of the flexible pack of FIG. 4A.

In this example, the containers 14 are loaded into the device 10 in FIG. 3A. The container 14 is loaded into the receptacle 12 by hand. Then a closing mechanism 44, such as a button, lever, paddle, or other mechanism, is used to close the receptacle 12 and to dispense the contents from the containers 14. Once the containers 14 are positioned in the device 10, a cup 16 is positioned below a funnel 18 that receives liquid from the containers 14. Then an opening mechanism 40, such as a puncturing mechanism, is used to make an opening in the container 14. An opening 46 is shown being made near the bottom, front of the pouch 14, but could be made at other locations, such as at the end, rear, or side. Some of the contents of the containers 14 may exit the container 14 upon contact of the container 14 with the opening mechanism 40. In some cases, the ingredients in the containers 14 will freely flow substantially entirely out of the containers 14 by gravity. This will in part depend upon the viscosity of the ingredients as well as the size of the opening 46 made in the containers 14 with the opening mechanism 40. In some cases, it may be beneficial to squeeze the contents of the containers 14 to ensure that the containers 14 are fully evacuated. This can be done at either FIG. 3B or FIG. 3C. Squeezing may occur by using pressure from the closing mechanism 44, or by using rollers (not shown), which are also typically applied with the closing mechanism 44.

FIG. 3B shows a cup 16 placed under the funnel 18 so that when the opening mechanism 40 opens the containers 14, the liquid can fall through the opening in the funnel 18 into the cup 16. FIG. 3C shows the introduction of water into the funnel 18 for mixing with the ingredients from the containers 14. The spray from the water nozzle 42 can be directed, if desired, to make a swirling pattern to clean the funnel 18 after the ingredients have been emptied into the funnel 18. The spray from the water nozzle 42 can also be directed at the opening mechanism 40 to clean the opening mechanism 40. Multiple ports or nozzles 42 may be used for introducing water into the funnel 18.

FIG. 3C also shows a squeezing zone 48, which is a location on the containers 14 where pressure can be applied to the containers 14 by the closing mechanism 44 to squeeze the contents from the containers 14. Then the closing mechanism 44 is closed in FIG. 3B, forcing the contents of the containers 14 to empty. FIG. 3D shows that the containers 14 can then be removed from the dispensing device 10 by pulling them out at their top end. The funnel 18 may be removable for cleaning, if desired. The squeezing zone 48 could have a different shape from that shown and could encompass the entire surface of the container 14.

FIGS. 4A and 4B depict the example container 14 shown in FIGS. 3A-3D. As discussed above, the container 14 is a bag or pouch that has a center seam 50. The pouch has a top, bottom and side edges, with a spout shape formed at the top end. The center seam is used to seal the side edges to one another so that there are no side panels present on the pouch. The center seam joins the front and rear panels of the pouch together so that contents may be sealed inside the pouch between the front and rear panels. The front and rear panels each inherently have a thickness. The center seam has a thickness consistent with the combination of front and rear panels that are sealed together to form the pouch. FIGS. 9A-9B and 10A-10C depict a similar pouch that has an external center seam 50 that connects the front and rear surfaces along the sides such that no side panels are present on the pouch. The seam 50 may be positioned in other locations if desired. Advertising indicia may be positioned on an exterior surface of the bag, if desired (not shown).

FIGS. 3A-3D depict the containers 14 being positioned side-by-side. However, if desired, the containers 14 could be stacked against one another, or be positioned back-to-back (not shown). In the example shown in FIGS. 3A-3D where the containers are stacked instead of positioned side-by-side, a single opening mechanism 40 could be used to open both containers 14. Alternatively, multiple opening mechanisms 40 could be used, one on either side. Stacking of the containers 14 may also make the form factor of the device 10 smaller.

FIGS. 5A-5C depict another dispensing method that utilizes a thermoformed container 14 that has a foil seal or liner 52 on one side of the container 14, as shown in FIGS. 6A and 6B. FIG. 5A depicts positioning the containers 14 in the device 10 by hand so that the leading end of the containers 14 are positioned near the funnel 18. While the containers 14 are shown as being positioned side-to-side, they could alternatively be positioned back-to-back, or stacked. After loading the containers 14 into the device 10, a closing mechanism 44 may be used for closing the device 10, such as a button, lever, or paddle, among other closing mechanisms. Upon closing, the opening mechanism 40 engages the liners 52 on the containers 14 to open the containers 14. The opening mechanism 40 cuts open the liner 52 near the bottom end/leading end to allow liquid to drain from the container 14. In addition, a water inlet 54 from a water source W may puncture the liner towards a top end of the liner to introduce water into the interior of the containers 14 to "wash" the interior to fully utilize all or substantially all the ingredients inside the container 14. Water may continue to run through the container 14 even after the fluid in the container 14 has been removed from the container 14 such that clean water runs through the funnel 18 at the end of the dispensing process. While not shown, water could also be dispensed directly into the funnel 18 to aid in washing the funnel 18 and to add more water to the mixture.

The opening mechanism 40 and the water inlet 54 may puncture the liner at substantially the same time, or one may puncture before the other. A controller C or processor can be used to sequence the opening of a valve to introduce water into the containers 14. A controller C or processor could also be used to close the containers 14 in the receptacles 12 and to move the opening mechanism 40 and the water inlet 54 towards and into the container 14, if desired. Alternatively, some of these functions can be done by hand. The pierced opening 46 is shown in FIGS. 5B-5C to occur on only one side of the container 14. It is possible for the pierced opening 46 to occur on both sides, with the puncture 46 at the bottom of the container 14 being on the liner side and the water inlet 54 puncturing on the opposite side and vice versa.

The water inlet 54 may include a puncturing mechanism 40 or the water inlet 54 may be positioned directly adjacent a puncturing mechanism 40 to puncture the container 14. The puncturing mechanism 40 is designed to properly puncture the container 14 based upon the thickness and type of material used for the surface of the container 14. FIG. 5B shows the ingredients from the containers 14 being dispensed into a glass 16 after being deposited onto the funnel 18. The funnel 18 has a central opening 24 to deposit directly into an underlying glass 16. The opening 24 could be non-centrally located, if desired. FIG. 5C shows the containers 14 being substantially emptied and ready for removal. The upper area of the containers 14, above Line L shows that part of the containers 14 extend above a surface of the housing 56 to make it easier for the consumer to grab and pull the containers 14 from the housing 56.

FIGS. 6A and 6B show a thermoformed container 14 that has a vacuum sealed liner 52 on one side thereof. The thermoformed container 14 can be made of PET, Polypropylene, Polystyrene, PETG, Surlyn, and HDPE food-grade materials or other materials. The seal 52 could be a foil seal or could be other types of materials, including any number of polymeric materials or combinations of materials in layers. The liner may comprise a combination of materials in layers or could be a non-foil seal. The container 14 shown in FIGS. 6A and 6B has sloped side walls 58 and a flat bottom and top surface. The container 14 has a necked down portion 60 that suggests the shape of a bottle. Other sizes and shapes could be used. The seal 52 can be hermetic to preserve product freshness and shelf life and have inner layers that promote freshness and shelf life. While the liner is described as being vacuum sealed, it could be applied in other manners as known by those of skill in the art.

Figures 7A, 7B, 7C, 7D:
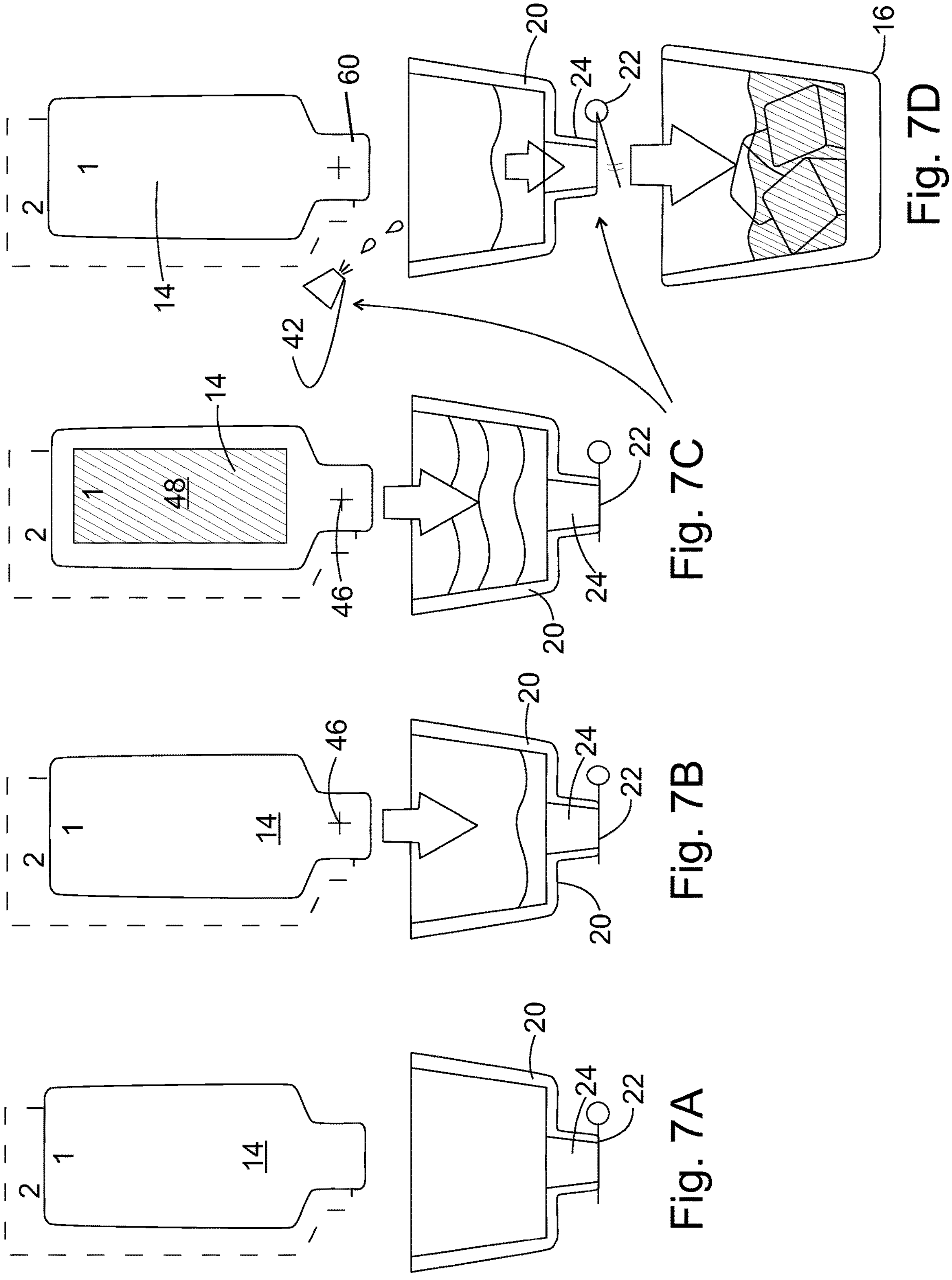
FIG. 7A depicts a schematic of dispensing according to FIG. 2D, with the containers being positioned in the dispensing device.
FIG. 7B depicts a schematic of dispensing that occurs after FIG. 7A where the contents of the containers are deposited into a closed reservoir.
FIG. 7C depicts a schematic of dispensing that occurs after FIG. 7B where all the contents of the containers have been deposited into the closed reservoir.
FIG. 7D depicts a schematic of dispensing that occurs after FIG. 7C showing water being added to the reservoir and the valve to the reservoir being opened to dispense the ingredients into a cup.

FIGS. 7A-7D depict an alternative embodiment where the container 14 is a bag, similar to that shown in FIGS. 4A and 4B. A single container 14 could be used, or multiple stacked containers 14 could be used at a single time. The design includes a reservoir 22 instead of a funnel 18, with the reservoir being closed by a valve 22. The reservoir 20 is shown having a flat bottom but could have a sloped bottom to promote the transfer of fluids from the reservoir outlet 24. FIG. 7A shows the container 14 or containers 14 being positioned in position adjacent the reservoir 20. Once the containers 14 are placed in the receptacles 12, if a door is provided, the door 62 can be closed upon the containers 14 by using a button, lever, paddle, or other mechanism.

FIG. 7B depicts opening the containers 14 so that they are punctured at a bottom end to allow fluid to exit the containers 14. If one container 14 is inserted at a time, then the steps of 7A and 7B would be repeated. If multiple containers 14 are inserted, they can be punctured at the same time and dispensed at the same time. The puncturing/opening mechanisms 40 can be coupled to the closing mechanism 44 to puncture the containers 14 when the door 62 or other mechanism is being closed. Once closed, the puncturing mechanism 40 punctures the containers 14. This can occur either automatically because of the movement of the door/doors 62 or electronically, with a puncturing mechanism 40 moving inwardly and outwardly.

Once the containers 14 are positioned inside the housing 56 and punctured, the containers 14 can be pressed or rolled to squeeze the contents from the containers 14. This can occur simultaneously with the door closing and puncturing steps of FIG. 7B or can occur electronically by using a roller mechanism or other mechanism (not shown) to squeeze and press the contents from the container 14. FIG. 7C shows a squeezing zone 48 on the container 14. Since the reservoir 20 is closed by the valve 22 during the dispensing phase, it is not initially necessary to input water to the system. Once all the contents of the containers 12 are emptied into the reservoir 20, the valve 22 can be opened to release the materials from the reservoir 20 into an underlying cup 16. At the same time, water can enter the reservoir 20 from the water source W. A nozzle 42 can be used for directing the water at one or more locations within the reservoir 20. The water is metered out to mix with the contents of the containers 14 in a fixed amount to make the "perfect" drink. In addition, the water helps to clean the reservoir 20, since it may exit the reservoir 20 after the contents of the containers 14 have existed the reservoir 20.

When multiple containers 14 are positioned above the reservoir 20, ribs or barriers may be positioned inside the housing 56 to guide the containers 14 into respective slots. In addition, when multiple containers 14 are positioned in the receptacles 12, they can be easily removed by pulling them out at the same time from the top.

The valve 22 shown in FIGS. 7A-7D could be any type of known valve. Examples include flapper, ball, or stopper valve, among other valves. Preferably, the valve 22 does not disrupt the flow of fluid from the reservoir 20 upon opening. Other types of valves 22 that may be used are diaphragms. The valve 22 could be manual or electronic. When the valve 22 is electronic, a controller C, motor, and switch (not shown) can be used to control the valve 22 in a conventional manner, as known by those of skill in the art. An electromagnet (not shown) could be used to open the valve 22. A gear box (not shown) may be added if necessary for proper operation of the valve 22.

Figures 8A, 8B, 8C:
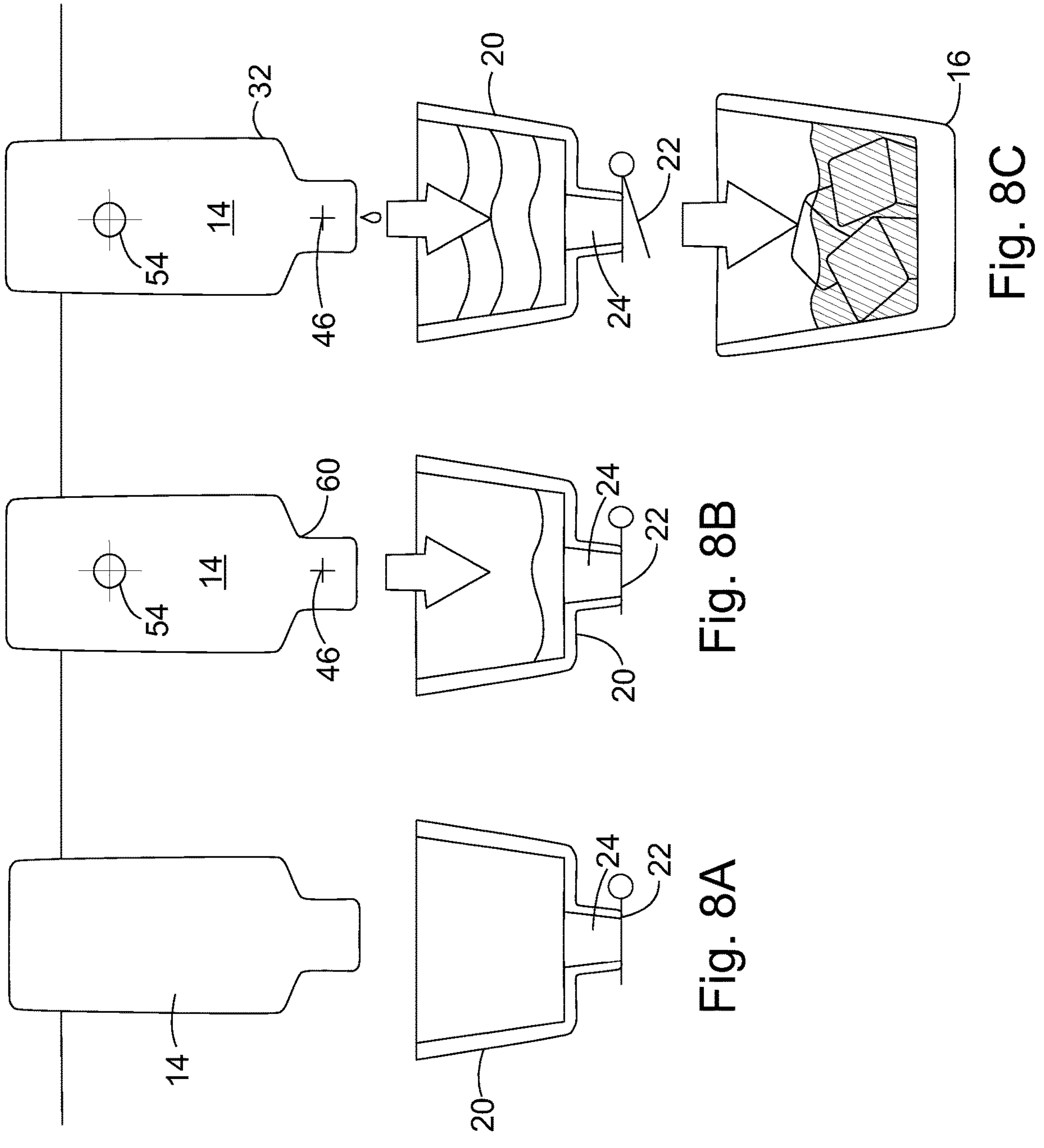
FIG. 8A depicts a schematic of dispensing according to FIGS. 2D and 2B, with one or more containers being positioned in the dispensing device.
FIG. 8B depicts a schematic of dispensing that occurs after FIG. 8A where the contents of the containers are deposited into a closed reservoir.
FIG. 8C depicts a schematic of dispensing that occurs after FIG. 8B where all the contents of the containers have been deposited into the closed reservoir and the valve to the reservoir being opened to dispense the ingredients into a cup.

FIGS. 8A-8C are similar to the device 10 shown in FIGS. 7A-7D, but instead of using a container 14 in the form of a bag, they utilize a thermoformed container 14 with a liner 52 on one side. They could alternatively use an injection molded container 14 with a liner 52 positioned at multiple different locations. FIG. 8A shows the container 14 in position over the reservoir 22. FIG. 8B shows the container 14 being dispensed into the reservoir 22. The container 14 is punctured at a lower end and a water nozzle 42 enters at the upper end to wash water through the container 14. In both steps, the valve 22 at the outlet of the reservoir is closed.

FIG. 8C shows how the ingredients in the container(s) 14 have been dispensed into the reservoir 20 and the valve 22 being opened to allow the ingredients and water to flow into a glass 16 that is positioned under the reservoir outlet 24. As discussed above in connection with FIGS. 7A-7D, an opening mechanism 40 may be used to puncture the container 14 and different types of valves 22 may be used, along with controllers and switches as needed. In addition, as discussed in FIGS. 5A-5C, a water inlet 54 is used to inject water into the container 14. Additional water may also be added to the reservoir 20 either before or after the valve 22 has opened to further dilute the contents of the reservoir 20 or to aid in washing the reservoir 20.

While not shown in FIGS. 8A-8C, it is contemplated that two or more containers 14 could be stacked in the housing

56 at one time and punctured simultaneously with a single opening mechanism 40 or with multiple opening mechanisms 40. Guides, rails, or barriers may be used inside the housing 56 to allow proper placement of multiple containers 14. In addition, while the entrance for the water nozzle 42 is shown as being on the side of the container 14, it could be on the sides or top of the container 14, or on the bottom end of the container 14. If the water inlet 54 is on the bottom end of the container 14, the opening mechanism 40 (puncturing mechanism) and the water inlet 54 could be one-in-the same, as long as a punctured hole 46 that is made is larger than the water inlet 54 to allow ingredients and water to flow out of the container 14 around the inlet nozzle 54. As with prior embodiments, the containers 14 can be removed by pulling on an upper part of the containers 14 that sits above an upper surface of the housing 56. In addition, if desired, the reservoir 20 can be designed to be removable for occasional cleaning outside of the housing 56. The reservoir 20 could be replaced with a blender, mixer, or stirring chamber, if desired.

Figures 9A, 9B, 9C:
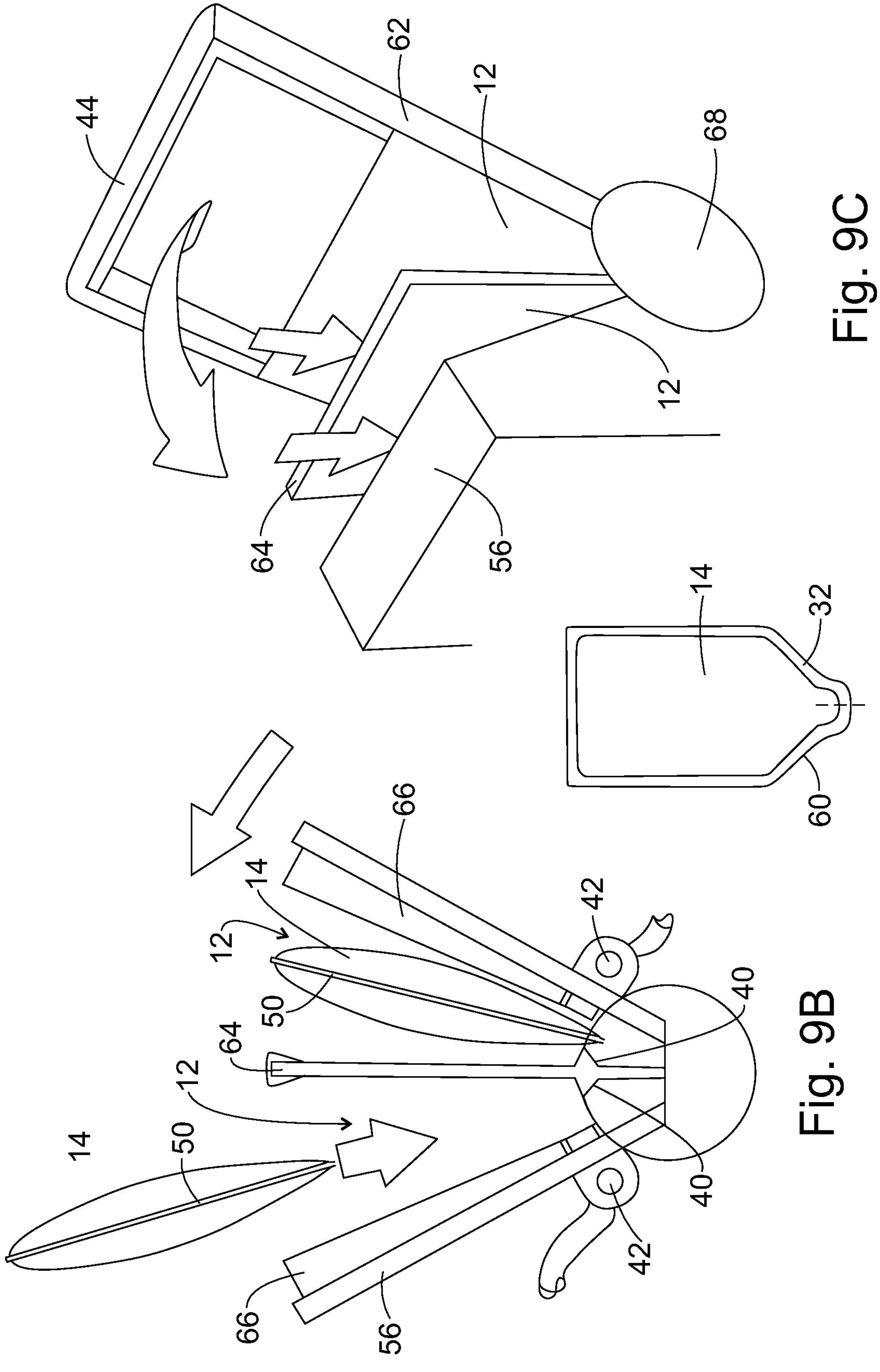
FIG. 9A depicts a container for insertion into the device shown in FIGS. 9B and 9C.
FIG. 9B depicts the container of FIG. 9A being deposited into receptacles in the dispensing device.
FIG. 9C depicts closing the receptacles to dispense the ingredients from the containers by squeezing.

FIGS. 9A-9C depict one embodiment of the receptacles 12 for receiving the containers 14 in a back-to-back or stacked position. In this embodiment, pouches, or bags 14 are utilized and positioned in receptacles 12 in the housing 56. This embodiment is similar to that shown in FIGS. 3A-3D and 7A-7D in that the containers 14 are squeezed to release the contents from the containers 14. In this embodiment, as shown best in FIG. 9B, a barrier 64 is positioned between the first receptacle 12 and the second receptacle 12 and the barrier 64 includes an opening mechanism 40 in the form of a piercing element extending from either side thereof for puncturing a lower end of the container 14.

The receptacle 12 has door panels 62 that are on either end of the receptacles 12 for closing down upon the containers 14. A closing mechanism 44 in the form of a lever, handle, or other mechanism can be used to close the containers 14 within the receptacles 12. The doors 62 have ramps or wedges 66 positioned on either side of the containers 14 to effectively squeeze the contents from the containers 14. The ramps 66 may be designed to apply greater pressure at a top end first so that the containers 14 are squeezed from the top down, if desired. Alternatively, the door panels 62 may evenly squeeze the containers 14. A water nozzle 42 is shown provided adjacent the lower end of the receptacle 12 to wash water over the end of the container 14 and piercing elements 40 and into the cup 16 that is positioned below.

A funnel 18 may be used to help direct the liquid from the containers 14 into a cup 16. If a funnel 18 is not used, a splash guard (not shown) may be used to help deter liquid from splashing out of the containers 14. The door panels 62 may include compressible ramps 66 that help to squeeze the containers 14. A linkage (not shown) may be provided at the pivot point 68 of the doors 62 to allow for different types of movement of the door panels 62. In addition, the pivot point 68 does not need to be a single pivot point. It could have offset pivot points. A linkage could be used to provide some linear movement of the doors 62 relative to one another. Examples of possible linkages include rack and pinion, cams, or other linkages. The linkages may be off to the side of the receptacles 12 or driven off a lever, among other techniques.

Figure 10C:
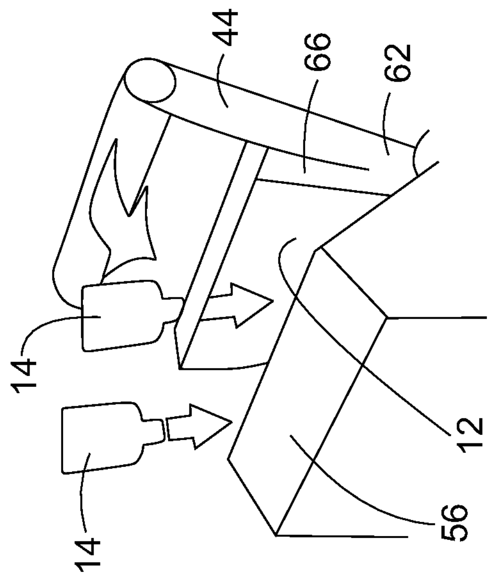
FIG. 10C depicts closing the receptacle to squeeze the contents from the containers.
Figure 10A:
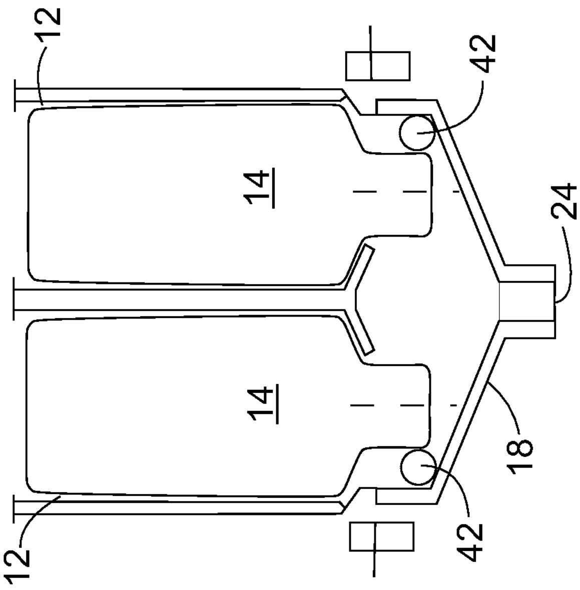
FIG. 10A depicts two containers positioned in two side-by-side receptacles of s dispensing device.
Figure 10B:
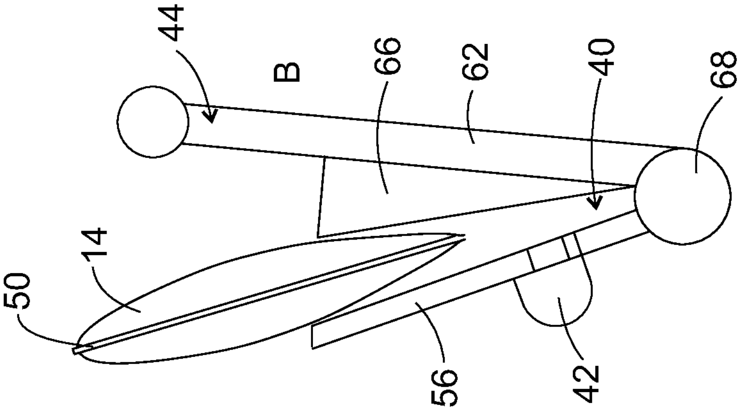
FIG. 10B depicts a side view of a container being positioned in a receptacle shown in FIG. 10A.

FIGS. 10A-10C are similar to the example shown in FIGS. 9A-9C, except for instead of stacking the containers 14, the containers 14 are positioned in side-by-side relation. The dispensing device 10 is similar to that shown in FIGS. 8A-9C in that it involves a door 62 that rotates inwardly to close the receptacles 12 and dispense fluid from the containers 14 by squeezing or pressing on them. The piercing mechanism 40 is shown built directly into a barrier 64 that is provided inside the receptacles 12, so the containers 14 need to be positioned low enough in the receptacle 12 for the piercer to work to open the containers 14. Ridges and barriers may be provided under, over, and between the containers 14 in the receptacle 12.

A water inlet 54 is shown provided in the vicinity of the piercing member 40 on each side of the receptacle 12 to assist in washing fluid from the containers 14 down into the underlying funnel 18. The funnel 18 has an outlet 24 for dropping the fluid by gravity into a cup 16. The water inlet 54 may be positioned at other locations, such as to the side of the piercer 40 or on top of the piercer, if desired. The water inlets 54 help to wash the funnel 18 after all the liquid has been pressed out of the containers 14. The water could be cycled in sequence through the water inlet 54 so that the water inlets 54 open after the containers 14 have been pressed to release the fluid inside the containers 14.

FIG. 10B shows how one of the walls in the receptacle 12 has a ramped portion 66 that assists in squeezing the contents from the container 14. The ramp 66 can be designed to provide pressure first to one end over the other, or to provide uniform pressure. The door panel 62 of the device 10 is shown as being rotatable inwardly to close the receptacles 12 about a pivot point 68. The door panel 62 could be designed with offset pivots so that part of the motion of the door panel is linear to promote even squeezing of the container 14 or squeezing from the top down. The door panel 62 may be closed by pulling the door panel 62 forward. A detent (not shown) or resilient member (not shown) could assist in keeping the door panel 62 closed during squeezing and could be released by pulling back on the handle 44. Other types of closing mechanisms 44 could be used, including other mechanical locking mechanisms and electronic locks, if desired. Upon opening of the receptacles 12 after dispensing, the containers 14 could be ejected with an ejecting arm (not shown) to allow the user to easily remove the containers 14.

While not shown, four pouches could be utilized instead of two, with two pouches being stacked on top of each other in each receptacle 12. The puncturing mechanism 40 would need to be long enough and sturdy enough to puncture both containers 14 on each side.

Figure 11B:
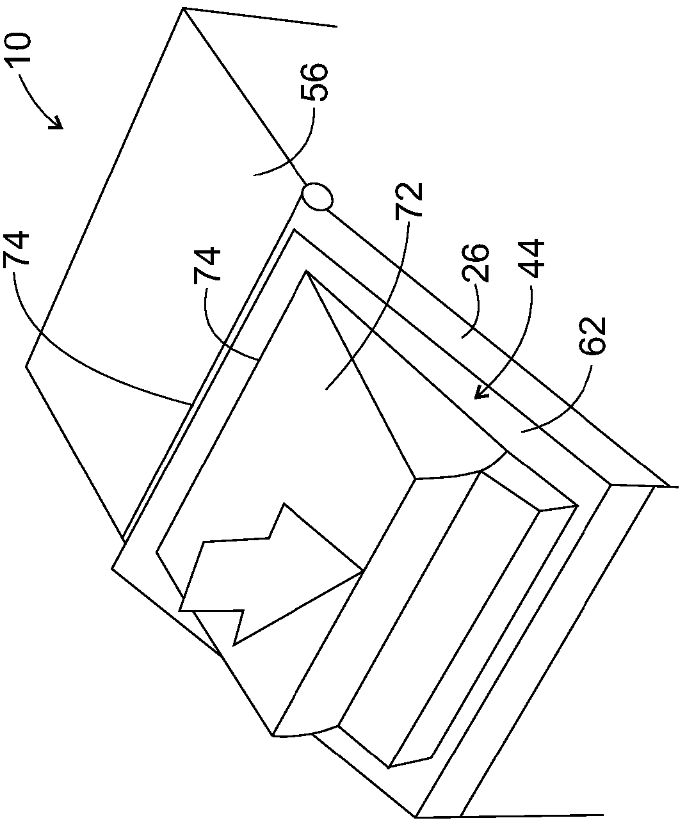
FIG. 11B depicts closing a door on the receptacle to squeeze the ingredients from the containers.
Figure 11A:
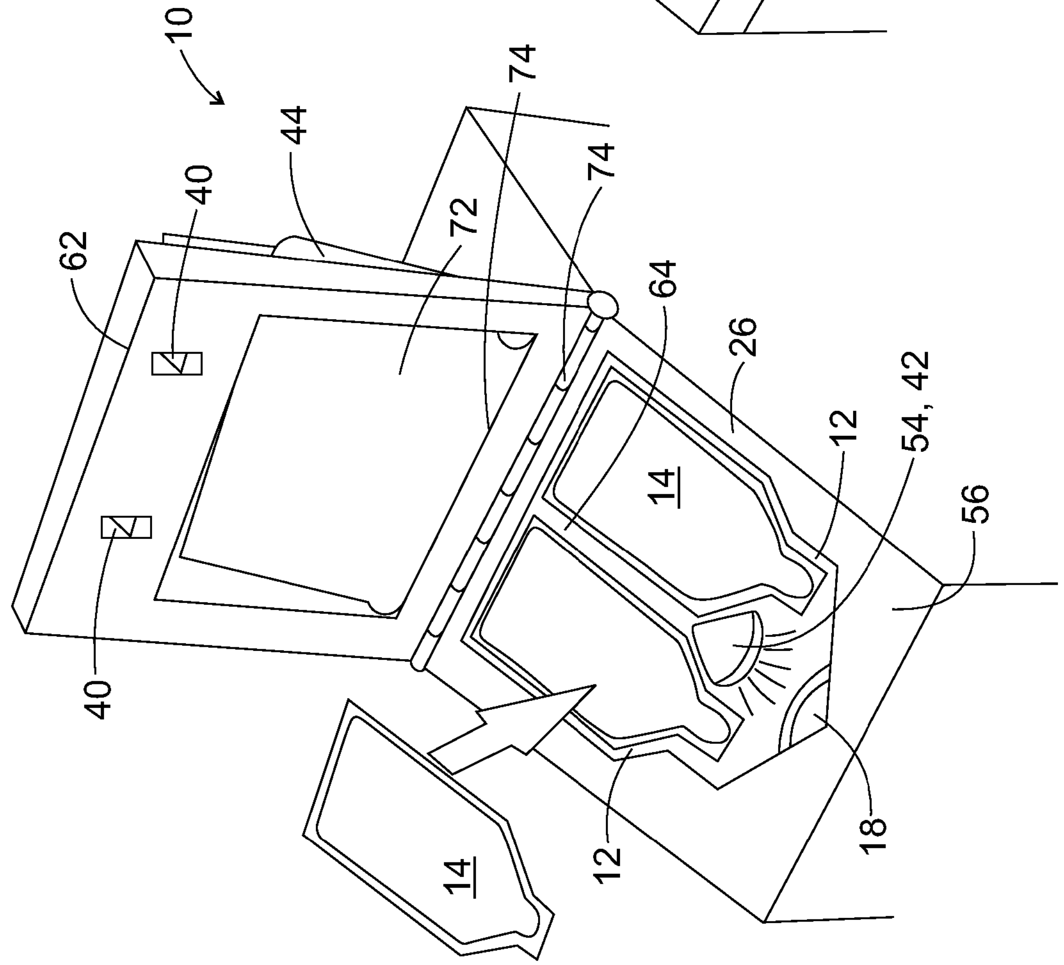
FIG. 11A depicts an alternative embodiment where the containers are positioned in receptacles on a top surface of the device.

FIGS. 11A-11B depict an alternative embodiment similar to that shown in FIGS. 10A-10C, but with an upwardly facing receptacle 12 that has a door 62 that closes down on top of the receptacle 12. Receptacles 12 are formed on an upper surface 70 of the housing 56 and may include ribs, ridges, and/or barriers to hold the containers 14 in side-by-side relation in the receptacles 12. The user positions the containers 14 in the receptacles 12 neck down. The receptacle 12 has a built-in funnel 18 positioned below the lower ends of the containers 14 to direct the contents of the containers 14 into an opening 24 provided at the bottom of the funnel 18. The liquid from the containers 14 travels through this opening 24 into a glass 16 that is positioned below the opening 24. A water sprayer 42 is provided between the two receptacles 12 to add water to the mixture and to clean the funnel 18 and lower ends of the containers 14, as well as the opening mechanisms/piercers 40.

Piercers 40 are positioned on a door 62 that closes the receptacles 12. The piercers 40 may be retractable, if desired. If retractable, the piercers 40 could be associated with a spring-loaded panel that can be pressed downwardly to pierce the containers 14 in the receptacles 12 and retract upon release of the panel (not shown). When the door 62 is closed, the piercers 40 engage the containers 14 to open the containers 14 at a bottom end thereof. Then the user can press a rotatable cover 72 downwardly to squeeze the liquid from the containers 14. A lower surface of the cover 72 acts upon the containers 14 when the cover is pressed since the cover rotates over the containers 14. The water sprayer 42 can be activated while the cover 72 is being pressed down, or after the cover 72 is released. The cover 72 can be spring loaded so that the user presses against the force of the spring and then the cover 72 returns to a non-engaged position upon release by the user. The piercers 40 may be coupled to the cover 72, as well, so that a separate piercing panel is not needed. Alternatively, the piercers 40 could be non-retractable. A hinge 74 is provided at the top of the door panel 62 and at the top of the cover 72 to allow for pressure to be applied to the pouches from the top down. After a drink has been dispensed, the user opens the door panel 62 and removes the emptied containers 14 by hand.

Figure 12C:
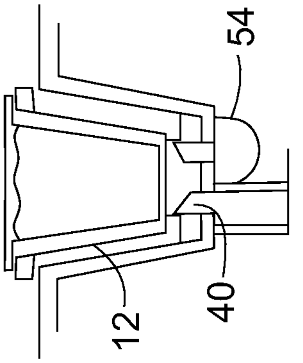
FIG. 12C is an alternative embodiment showing opening of the container occurring on the bottom surface of the container.
Figure 12B:
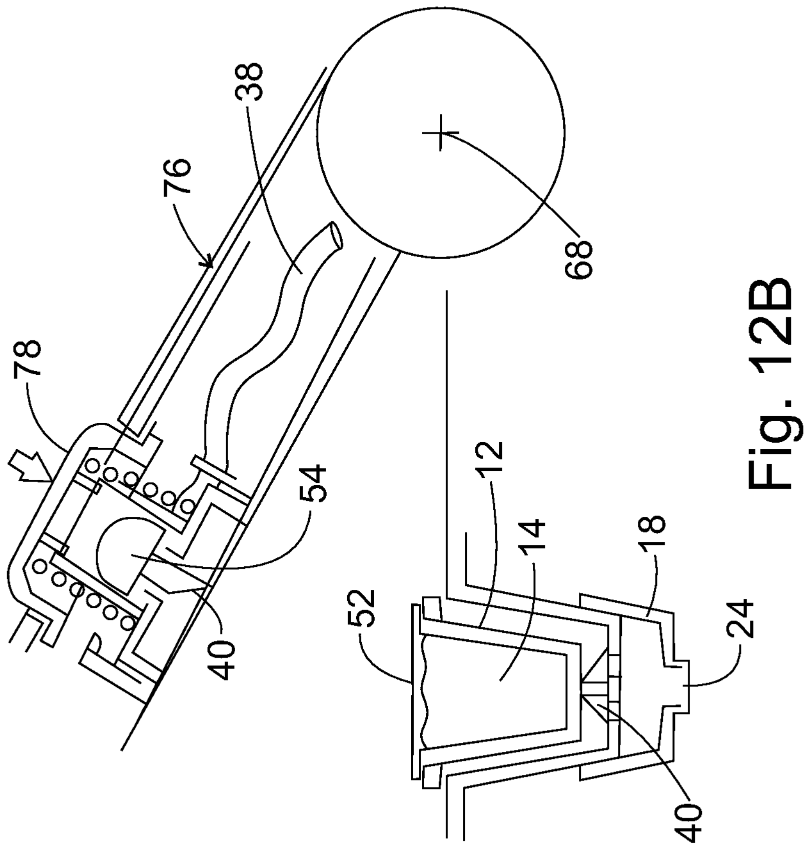
FIG. 12B depicts an alternative embodiment where the container of FIG. 12A is positioned vertically in a receptacle and an arm rotates downwardly over the container to open the container.
Figure 12A:
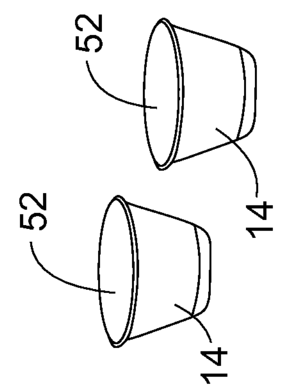
FIG. 12A depicts an alternative shape for a container that is thermoformed and sealed with a foil seal.

FIGS. 12A-12C depict another alternative embodiment where the container 14 is shaped more like a cup. The cup is thermoformed with a liner 52 on top, such as a foil liner. While a single container 14 is shown, multiple side-by-side containers 14 could be used. The containers 14 are placed in a receptacle 12 so that the liner 52 is positioned upwardly. An arm 76 swings downwardly upon a pivot point 68 so that a piercing element 40 at the end of the arm 76 pierces the liner 52 on the container 14. Force provided by the arm 76 may also pierce the bottom of the container 14 to allow fluid to flow from the container 14 by gravity. Alternatively, the user may be required to press downwardly on the arm 76 to pierce the bottom of the container 14. Water may be input into the top opening of the container 14, as shown in FIG. 12B, or into a bottom opening of the container 14, as shown in FIG. 12C. If water is input at the bottom, the top piercing is not needed.

Figure 18A:
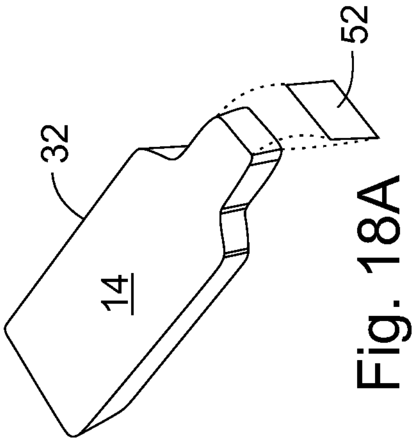
FIG. 18A depicts another alternative container that is bottle shaped and has an opening at the top end of the bottle that is sealed with a foil liner.
Figure 18B:
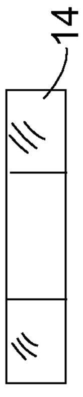
FIG. 18B depicts the container of FIG. 18A in an end view, showing the opening in the top end of the bottle.
Figure 18C:
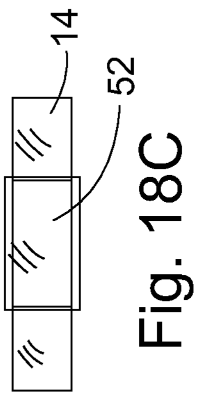
FIG. 18C depicts the container of FIG. 18A with a foil seal sealed over the opening in the bottle.

The arm 76 may be spring loaded so that it can be easily moved upwardly. In addition, the arm may have a spring-loaded portion 78 near the head end of the arm 76 that allows the user to close the arm 76 and then press downwardly against action of the spring to pierce the top and/or bottom of the container 14. Water and liquid from the container 14 exit the container 14 below the container 14 though drain created by the pierced hole in the container 14. While a cup-shaped container 14 is shown being used in this embodiment, other shapes of containers 14, including bags, could be used in this embodiment. As shown in FIGS. 18A-18C, a bottle-shaped container 14 could be used that has an opening at the end of the bottle only.

Figure 13A:
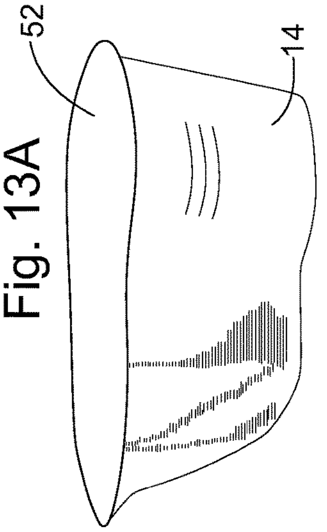
FIG. 13A depicts an alternative shape for a container.
Figure 13B:
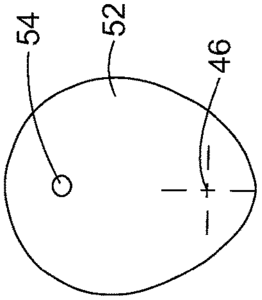
FIG. 13B depicts a top view of the container of FIG. 13A.

FIGS. 13A and 13B depict another shape for a container 14 that has as spout and is generally egg shaped when viewed from a top end. The container 14 may be formed by thermoforming the bottom reservoir of the container 14 and closing the container 14 with a film or liner, such as a foil film. The top surface of the containers 14 may be used for both a water nozzle inlet 54 and for a drain port 46. The water spout inlet 54 and drain port 46 could be at different locations, if desired. The container 14 of FIGS. 13A and 13B is depicted in one possible usage in FIGS. 14A-14C.

Figure 14A:
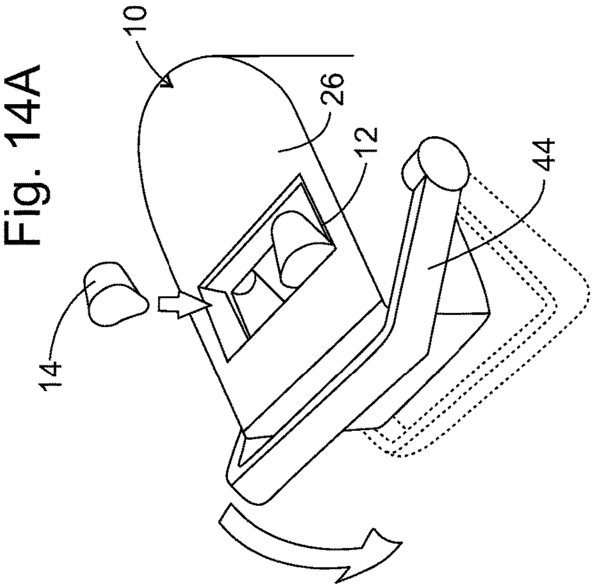
FIG. 14A depicts yet another alternative embodiment where a dispenser includes receptacles positioned on a top wall of the dispenser, and a pull lever is used to open the containers for dispensing.
Figure 14B:
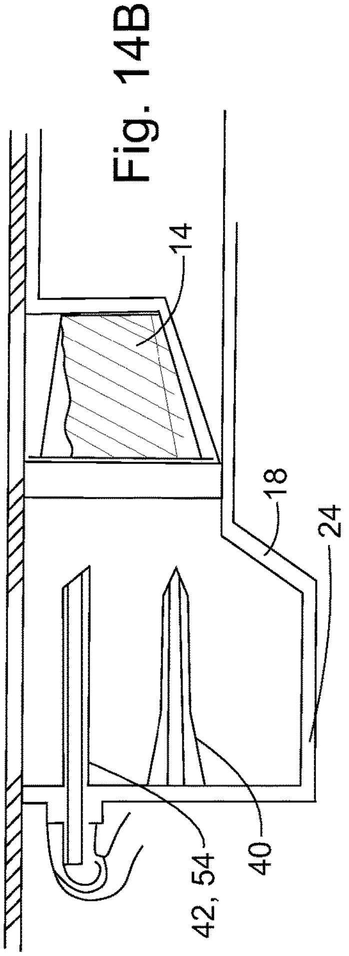
FIG. 14B depicts how a container moves horizontally toward a water source and a piercing element.
Figure 14C:
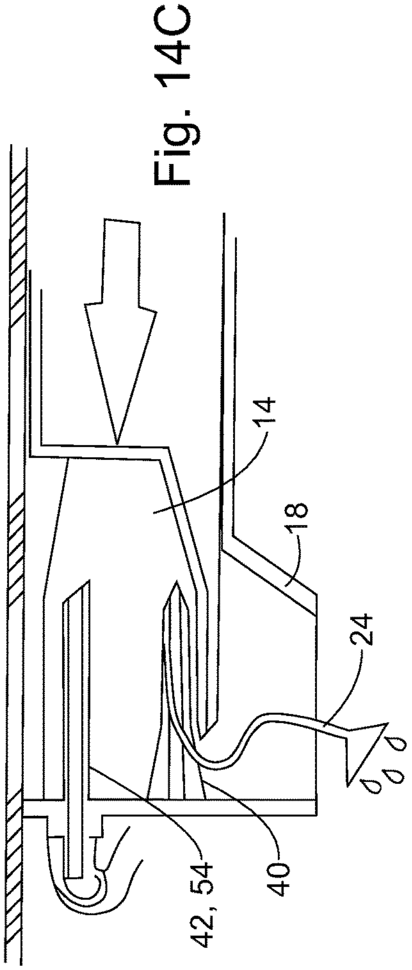
FIG. 14C depicts the container engaged with the piercing element and an inlet nozzle for water and dispensing of the ingredients and water though an opening in the bottom of the housing member.

FIGS. 14A-14C depict an embodiment where the housing 56 has an opening on a top surface 70 of the device 10 and the containers 14 are inserted into the receptacles 12 so that the film side 52 of the containers 14 faces the front of the device 10. A lever or handle 44 is pulled downwardly, which results in the linear movement of the containers 14 such that they move forwardly. FIG. 14B shows a side cross-sectional view of the container 14 in a receptacle 12 before the handle 44 is moved downwardly and FIG. 14C shows a side cross-sectional view of the container 14 when it has been moved forwardly by movement of the handle 44. When the container 14 is moved forwardly, it engages an opening mechanism 40 and a water inlet 54 that are positioned on a wall at the end of the chamber. Water enters the container 14 through the water inlet 54 and the contents of the container 14 and the water exit the container 14 through the drain hole 46 and are then deposited into a cup 16. A funnel 18 may be used, if needed, to direct the contents into a cup 16. The handle 44 may be spring loaded so that after it is released, the containers 14 travel rearwardly to allow a user to remove them from the receptacle 12. This example could also be utilized with other shaped containers 14.

Figure 15A:
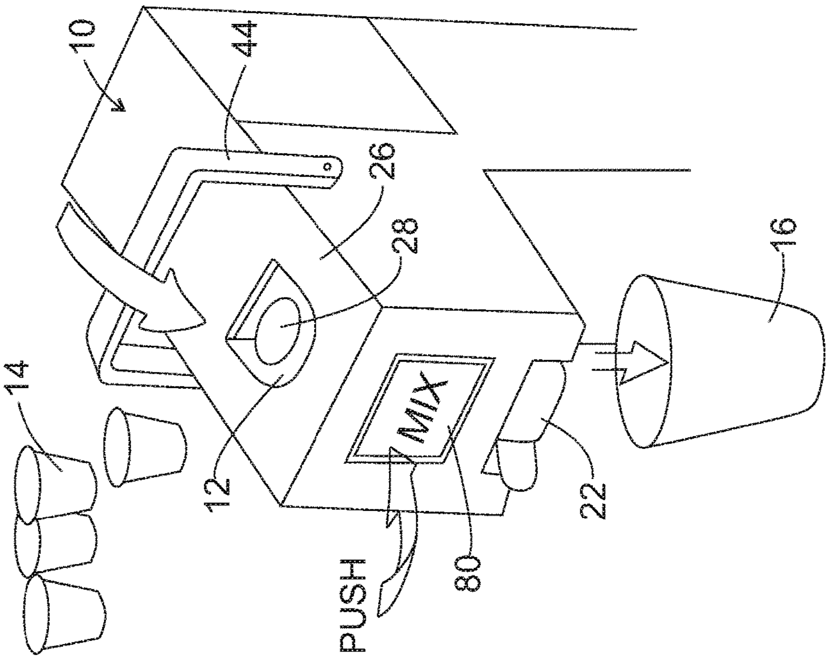
FIG. 15A depicts another alternative embodiment where one or more containers are positioned in a receptacle and the ingredients are mixed in a mixing chamber before being dispensed into a glass.
Figure 15B:
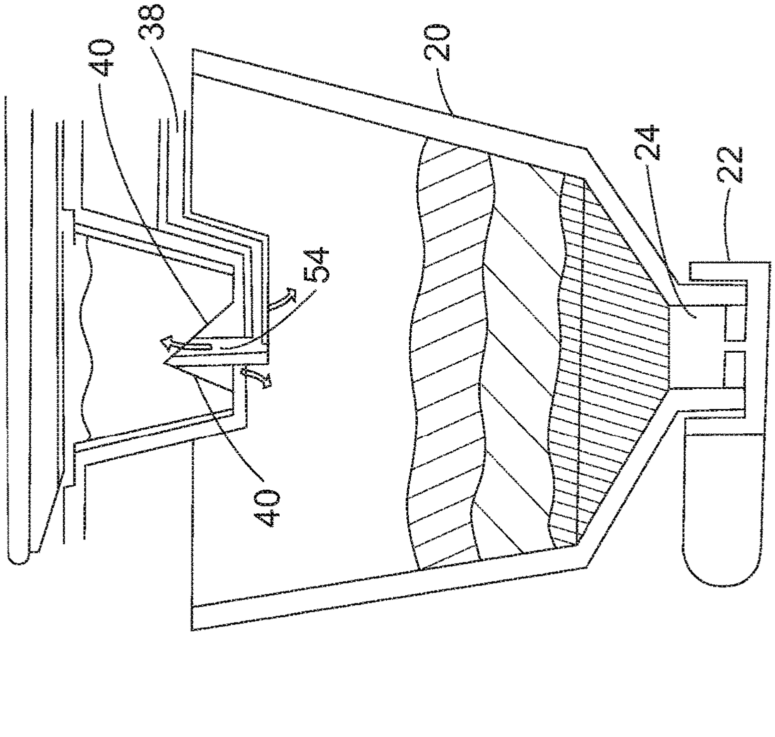
FIG. 15B is a cross-sectional view of the mixing chamber of FIG. 15A, showing how water is introduced below the container at the same time that the container is pierced.

FIGS. 15A and 15B depict yet another embodiment of the dispenser 10. In this example, a receptacle 12 is shown being positioned on an upwardly facing surface 70 of the dispenser 10. The receptacle 12 could be positioned at other positions, such as on the sides, as well. FIG. 15A shows only one receptacle 12, but it is anticipated that more than one receptacle 12 would be utilized. In this example, the container 14 is positioned in the receptacle 12 and a handle 44 is pulled forwardly. This causes the handle 44 or another door 62 to cover the container 14 in the receptacle 12 and to press it downwardly until it engages an opening mechanism 40, such as a piercer, and a water spout 54, but of which engage the container 14 on a lower surface of the container 14. After the handle 44 is positioned forwardly, the users presses a “MIX” button 80 on the front of the device 10, which activates the flow of water into the container 14. Liquid from the container 14 mixes with water inside the reservoir 20 that is formed under the container 14. The reservoir 20 is closed with a valve 22, which is shown to be a manual valve, but could be a non-manual valve that is activated to open when the user lets go of the mix button, or after a certain amount of time has passes, among other times. The reservoir 20 could alternatively be a blender or mixer and the user could operate the blender or mixer by pushing the MIX button. The MIX button is preferably tied to a motor or solenoid (not shown) to open the water flow into the mixing reservoir 20. Upon movement of the handle 44 back to its original position, the container(s) 14 can be removed from the receptacle 12.

Figure 16D:
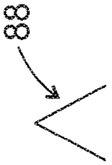
FIG. 16D depicts yet another example opening mechanism in the form of a V-shaped cutting element.
Figure 16C:
FIG. 16C depicts another example opening mechanism in the form of a piercing awl.
Figure 16A:
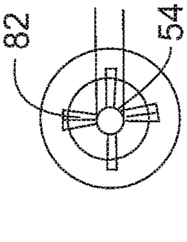
FIG. 16A depicts an example opening mechanism for opening the containers.
Figure 16B:
FIG. 16B depicts another example opening mechanism design for opening the containers in the form of a straight blade or exacto knife blade.

FIGS. 16A-16D depict various different types of opening mechanisms 40. FIG. 16A depicts a cruciform blade 82 and also shows how a water inlet 54 can be positioned to eject fluid through a center of the cruciform blade 82. FIG. 16B depicts a straight blade or an exacto knife blade 84. FIG. 16C depicts a pointed awl 86 and FIG. 16D depicts a V-blade 88, which can be formed by bending a piece of steel into a V-shape and sharpening it. Any of these opening mechanisms 40 may be used. They may be made of steel, another metal, or, in some cases, hard plastic.

Figure 17:
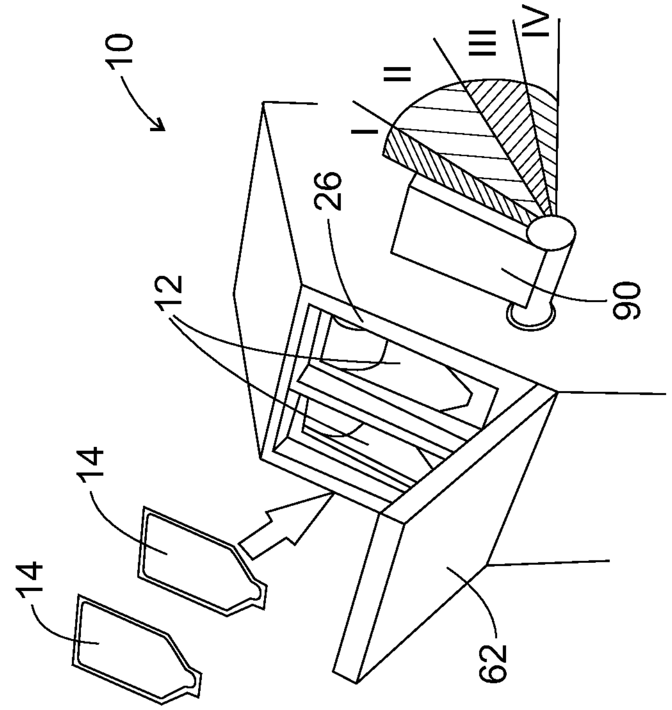
FIG. 17 depicts another alternative embodiment where the containers are position into a receptacle formed on an inclined surface of the dispensing device and a lever is used to dispense the ingredients from the containers.

FIG. 17 depicts another embodiment where receptacles 12 are positioned on an upwardly facing 70 or side facing surface of the dispenser 10. A door 62 closes the receptacle 12 and is hinged by a hinge 74 at a lower end of the door 62. Alternatively, the door 62 could be hinged at an upper end. The dispenser 10 has a lever 90 positioned on a side of the device 10. The lever 90 may be used to open and close the door 62, or the user can manually open and close the door 62.

After the containers 14 are positioned in the receptacles 12, the user closes the door 62. Then the lever 90 may be pressed downwardly to activate the device 10. A first movement of the lever I may close the door 62. A second movement II of the lever 90 presses the door 62 downwardly to cut the container 14. A third further movement III of the lever 90 causes the door 62 to press down on the container 14 to squeeze the contents from the container 14. A fourth further movement IV activates the water flow to clean the receptacles 12 and any funnel 18 that is positioned beneath the receptacles 12. A controller can be used to control the amount of water that is dispensed by the pump P so that enough water is mixed with the container ingredients. Thus, even if the user releases the lever before the water has fully flowed into the cup 16, the water will continue to fill the cup 16 to provide the "perfect" cocktail. Instead of a squeezing motion provided by the door 62, a rolling motion could be provided by rollers (not shown) that engage the container 14 when the lever 90 is pressed downwardly but retract when the lever 90 is released.

FIGS. 18A-18C depict an alternative container 14 that is formed by injection molding so that only a small portion of the container 14 needs to be covered by a liner or foil 52. In the embodiment shown, the top of the bottle-shape is the only open surface of the container 14. Alternatively, even a smaller surface could be left open, and the material could be formed so that it is thin enough to be easily opened by piercing. Any type of material may be used that is acceptable for food, including ABS, Acetal, K Resin, Nylon, PET, Polypropylene, Polyethylene, Styrene, TPE or other materials. The liner 52 can be a foil liner that is sealed to the opening in the container 14. Other types of covers or liners 52 could be used to close the opening in the container 14.

Figure 19:
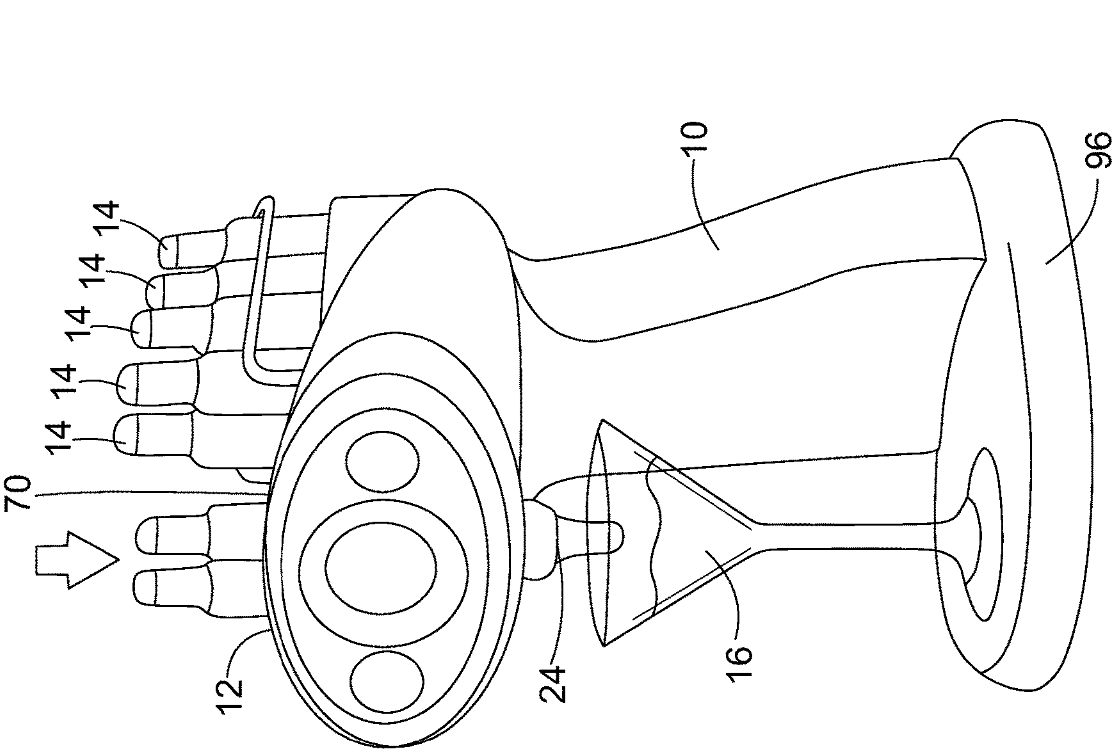
FIG. 19 depicts a perspective view of an alternative dispensing device design.
Figure 21:
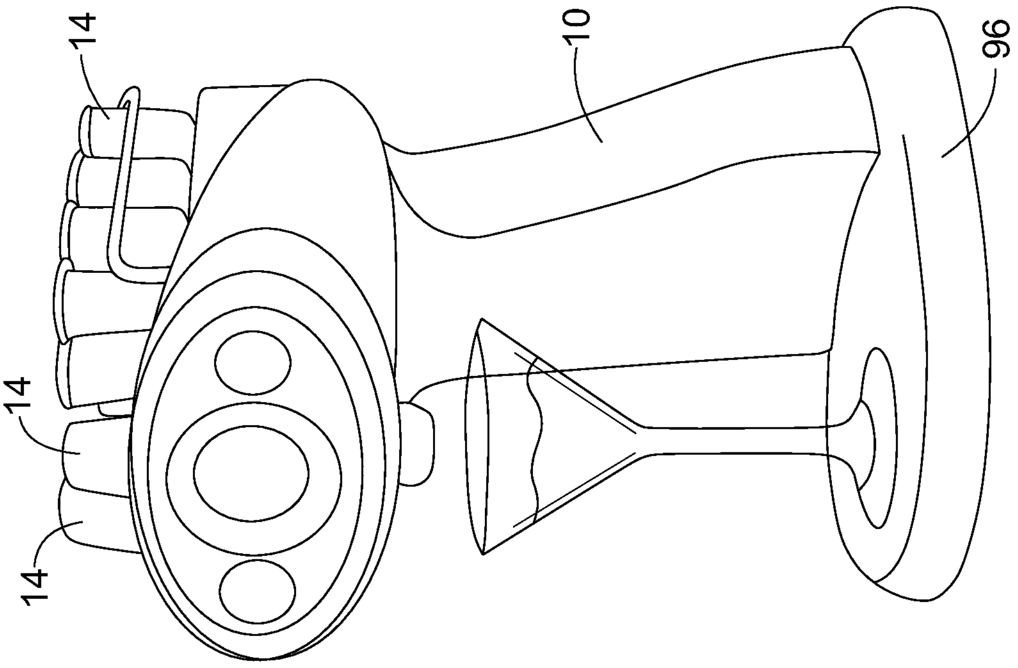
FIG. 21 depicts a perspective view of an alternative dispensing device design.
Figure 23:
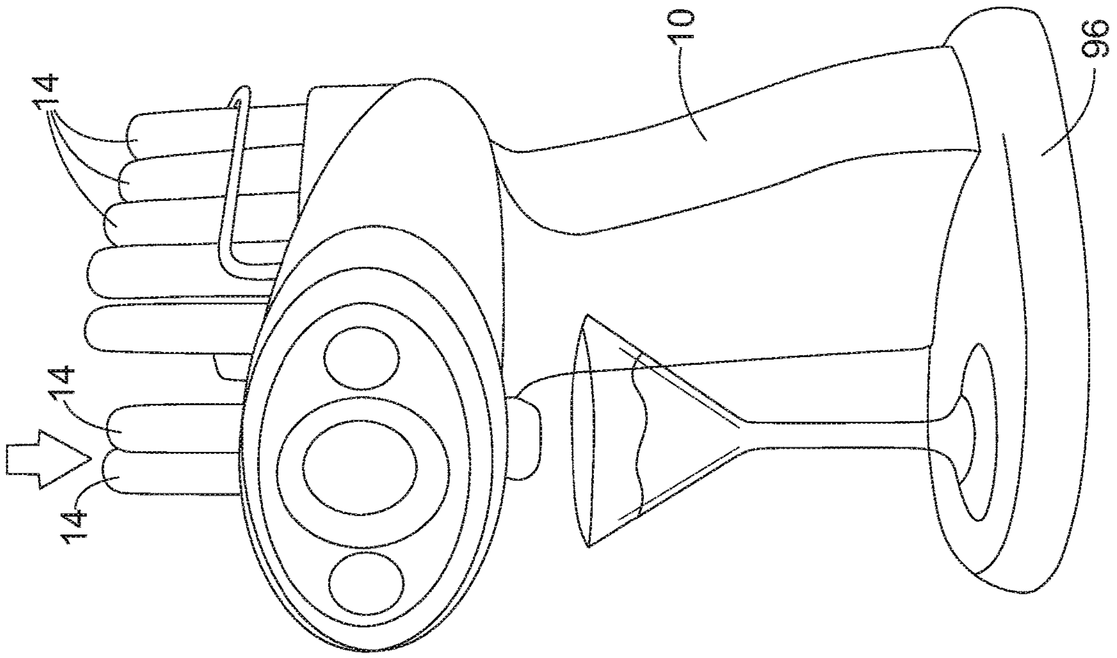
FIG. 23 depicts a perspective view of an alternative dispensing device design.

FIGS. 19, 21, and 23 depict an alternative dispensing device 10 where the receptacles 12 are positioned on an upper surface of the housing and additional containers 14 are stored on top of the dispensing device. FIGS. 19, 21, and 23 depict a cup/glass 16 positioned under the outlet 24 of the device 10.

Figure 20B:
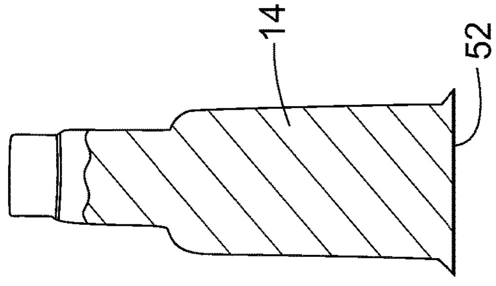
FIG. 20B depicts a cross-sectional view of the alternative container design of FIG. 20A.
Figure 20A:
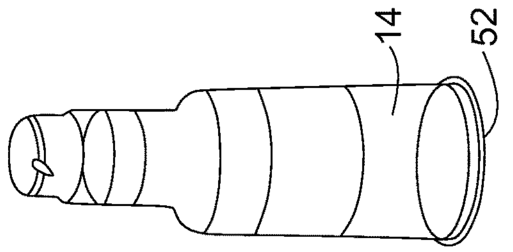
FIG. 20A depicts a perspective view of an alternative container design.

FIGS. 20A and 20B depict an alternative design for the container 14 in the form of a bottle. This container 14 can be formed by injection molding and has a seal 52 across a bottom surface. A rim 102 is also formed around the bottom of the bottle for seating of the seal thereon. The seal 52 can be any type of known seal for closing a container, such as a foil seal, among other seals, as long as it is strong enough to withstand normal shipping.

Figure 22B:
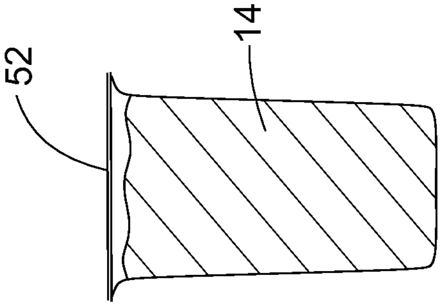
FIG. 22B depicts a cross-sectional view of the alternative container design of FIG. 22A.
Figure 22A:
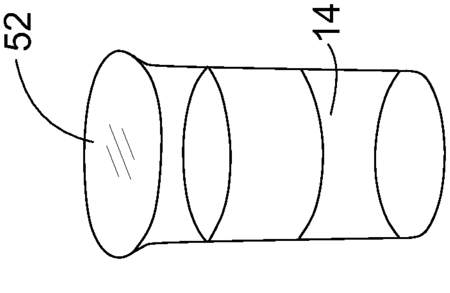
FIG. 22A depicts a perspective view of an alternative container design.

FIGS. 22A-22B depict an alternative container 14 design in the shape of a cup. The container 14 can be formed by injection molding and has a seal 52 across a top surface of the cup. A rim 102 is also formed around the top of the cup for seating the seal thereon. The seal 52 can be any type of known seal for closing a container, such as a foil seal, among other seals, as long as it is strong enough to withstand normal shipping. This design would easily permit the consumer to drink the contents of the container 14 straight up without mixing with a mixer.

Figure 24B:
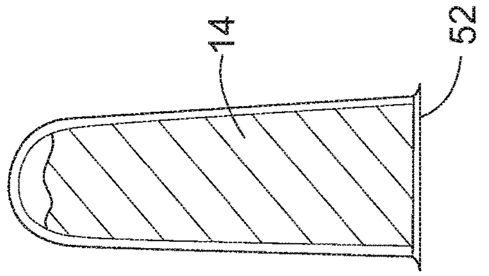
FIG. 24B depicts a cross-sectional view of the alternative container design of FIG. 24A.
Figure 24A:
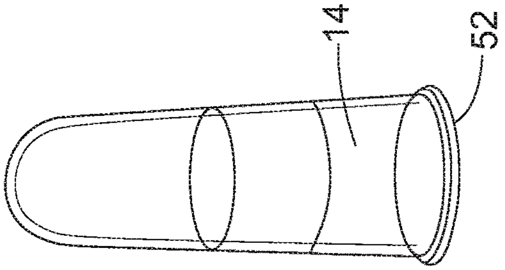
FIG. 24A depicts a perspective view of an alternative container design.

FIGS. 24A-24B depict an alternative container 14 design in the shape of a test tube. The container 14 can be formed by injection molding and has a seal across a bottom surface of the cup. A rim 102 is also formed around the bottom of the test tube for seating the seal thereon. The seal 52 can be any type of known seal for closing a container, such as a foil seal, among other seals, as long as it is strong enough to withstand normal shipping. This design could serve a dual purpose of use in the dispensing device 10 and use as a jello shot.

Figure 25:
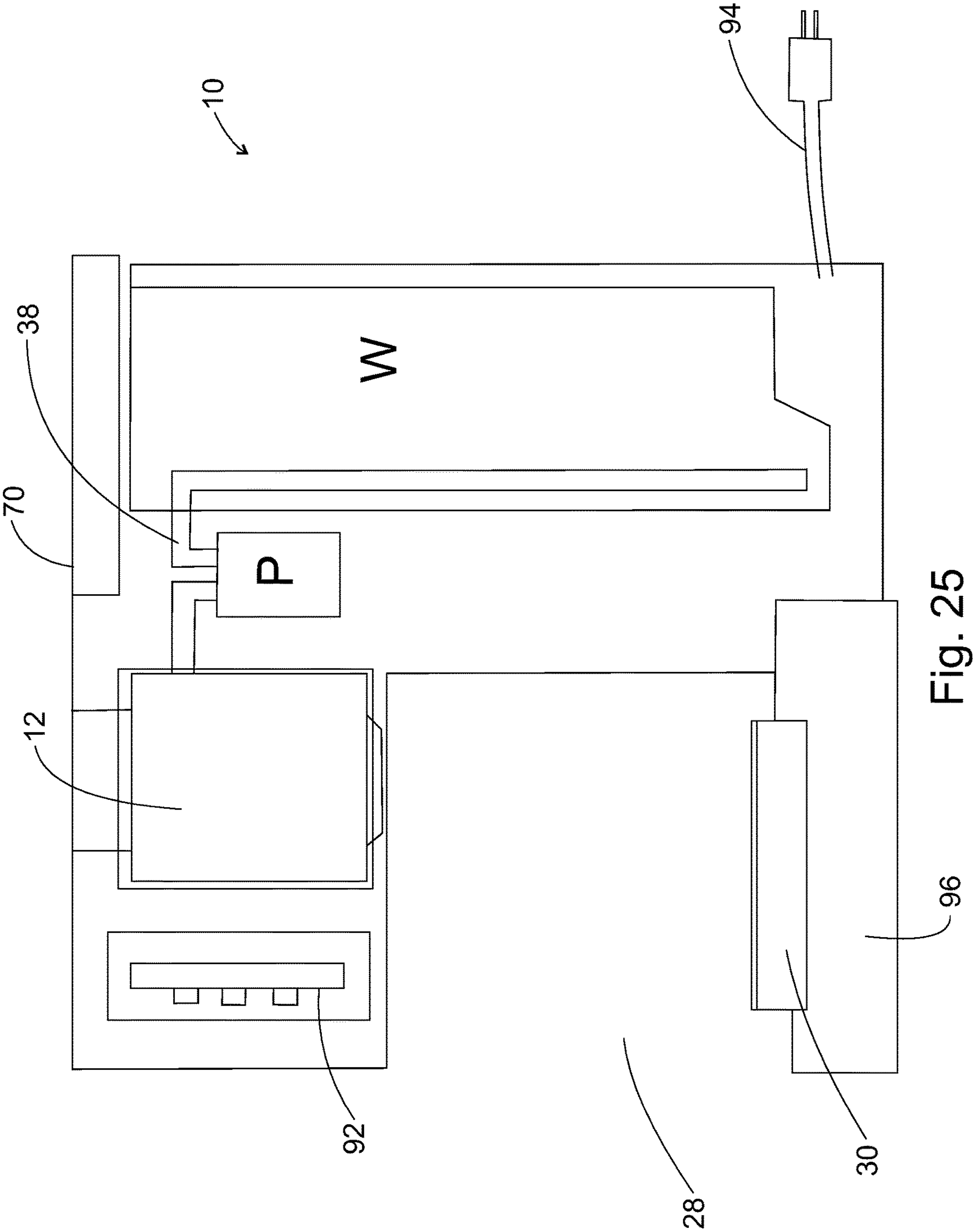
FIG. 25 depicts a schematic of the inner workings of one embodiment of the dispensing device.

FIG. 25 depicts a schematic layout of an interior of a dispensing device 10. The dispensing device 10 includes a water tank W, a base 96 and a power cord 94. The base 96 holds a drip tray 30. A top part of the device 10 includes a pump P coupled to the water reservoir W by fluid lines 38. The fluid lines 38 lead into the receptacle section 12 of the device and an outlet 24 is included for dispensing from the containers 14 when inserted into the receptacles. A control panel 92 is also shown as including several buttons on a front panel of the housing 56. The water reservoir may hold 32 ounces of water, among other amounts. The water reservoir could be removable so water can be chilled in advance. Other types of liquids may be held in the water reservoir, if desired, like ginger beer, for example. The power cord 94 provides power to the pump P.

Figure 26:
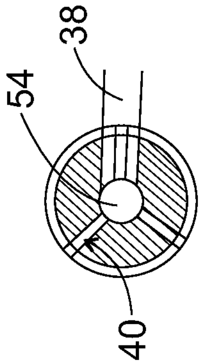
FIG. 26 depicts a schematic view of an alternative opening mechanism.

FIG. 26 depicts an alternative opening mechanism 40 in the form of a triple blade cutter, with the blades disposed around and extending outwardly from a water inlet 54. The fluid line 38 leads to the water inlet 54.

Figure 27B:
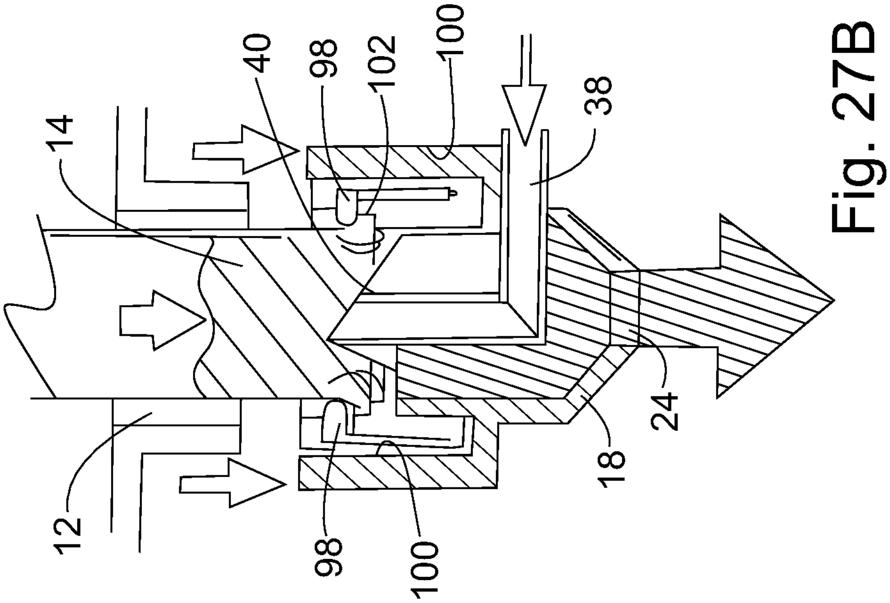
FIG. 27B depicts a cross-sectional view of the alternative receptacle design of claim 27A with the container being engaged with the container.
Figure 27A:
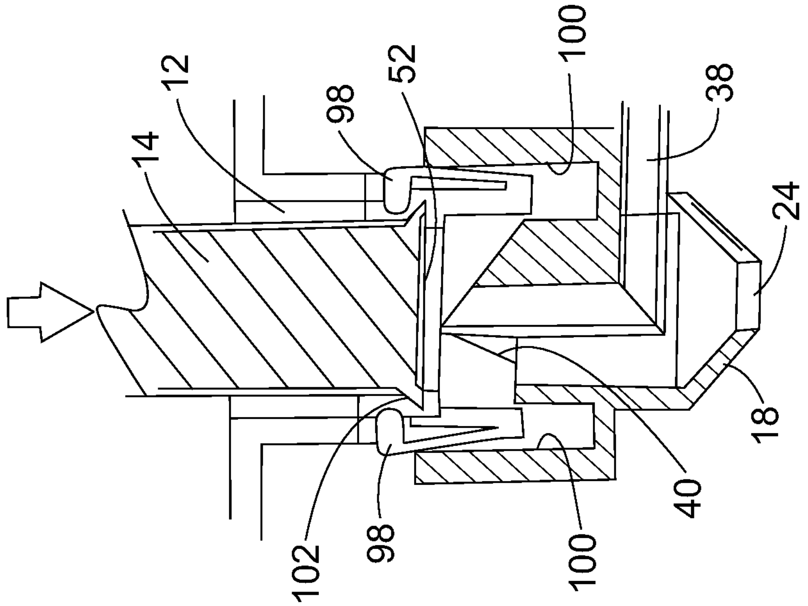
FIG. 27A depicts a cross-sectional view of an alternative receptacle design for dispensing ingredients from a container.

FIGS. 27A and 27B depict an alternative mechanism for dispensing the contents on the containers and could be used with any of the containers shown in FIGS. 20A & 20B, 22A & 22B, and 24A & 24B. In this embodiment, the container 14 is positioned in a receptacle so that the seal is facing downwardly. For the embodiment shown in FIG. 19, the container would be removed from the storage area on the top of the dispenser and positioned in the receptable so that the bottom of the bottle faces down. For the embodiment shown in FIG. 21, the container would be removed from the storage area on top of the dispenser and rotated so that the top of the cup faces downwardly. For the embodiment shown in FIG. 23, the container would be removed from the storage area on top of the dispenser 10 and positioned in the receptacle so that the seal is positioned downwardly.

FIGS. 27A and 27B depict the container 14 positioned in dual receptacles 12 that are positioned on top of the housing 56 of the dispenser 10. In this embodiment, it is not necessary to cover the top end of the containers 14 to activate the containers 14 to release their contents. Instead, the containers 14 are first positioned in the receptacles 12. A flange or arms 98 surround the sealed area 52 of each container 14 inside the receptacles 12. The user presses downwardly so that the arms 98 move downwardly. As the arms 98 move downwardly, they move against a camming surface that is defined on the arms 98 and on the inner wall 100 of the receptacle such that they move inwardly and trap the rim 102 of the container 14 below the arms 98. The arms 98 help to hold the container 14 in proper position for dispensing. As the container 14 moves downwardly, it is forced into engagement with an opening mechanism 40, which is shown as being a piercer. In addition, a water inlet 54 is positioned directly adjacent the piercer 40 for allowing the input of water into the container 14. The opening mechanism 40 causes the seal 52 to be broken and allows the contents of each container 14 to be evacuated from the container 14 and to flow downwardly into the funnel 18 and out the opening 24.

While not shown, another type of mechanism for dispensing may include a rotary or linear movement of a container 14 in a housing 56. In this example, a cover could be used to activate the movement of the rotary or linear movement of the containers 14. The containers 14 could be positioned in their respective receptacles 12, the cover could be closed and pressed downwardly to activate the device 10. Alternatively, a separate button could be pressed to activate the device 10. The cover helps to press the container 14 downwardly, which punctures the bottom of the cup 16 while the top is punctured with a water inlet 54. The contents of the container 14 are drained and water is added, which rinses the container 14. The containers 14 could be indexed so that one container 14 dispenses at a time, even though multiple containers 14 are loaded into the receptacles 12.

As previously discussed, where one or two containers 14 are shown, more than one or two containers 14 may be utilized.

The opening mechanisms 40 may be piercing, cutting, or slicing members, or other known members for opening a container 14. The opening mechanisms 40 are selected as a function of the type of containers 14 used to hold the ingredients. If one or more opening members are used, they each may be the same or different from one another.

The device 10 may be a counter-top machine that allows 2, 3, 4 or more liquids/slurries to mix together in specific ratios (minimizing liquid components to keep carbon footprint of the mixed drink at a minimum). A water source W may be a water reservoir W that is refillable and part of the device 10. A tank of any size, such as 32 ounces, may be utilized as the water reservoir W. Alternatively, the device 10 could be connected to a water line so that the water reservoir is not needed.

The container sizes and shapes may vary from that shown here and relative to one another in use. One possible size for a large pouch is a capacity of 6-8 oz. Another pouch or container may have a size of 1-2 ounces. The pouches or containers may hold concentrated ingredients. As such, the size of the pouches or containers may be reduced. For example, a 2-ounce pouch of orange juice concentrate may make 8 ounces of juice when properly re-constituted. Examples of types of components that may be used in making a cocktail using the device 10 include the following, which represent different viscosities: Syrup, Alcohol, Juice/Juice Puree, Dairy, a combination thereof, or other components not mentioned.

The dispensing device 10 is compact and stylized. The dispensing device 10 is easily cleaned/maintained. A separate container may be added to the first and second containers 14 to provide a carbonating component. Alternatively, a separate carbonation system may be utilized along with flavoring and alcohol containers 14. A $CO_2$ container may be used for purposes of carbonation, if desired.

The dispenser 10 may be used to make any number of different types of cocktails. Examples of types of cocktails include those presented at http://www.drinksmixer.com/cat/1/ (12000+ cocktail recipes). As an example, one type of cocktail that may be made with the device 10 is "Sex on the Beach," a popular fruit mixed drink made of vodka, peach schnapps, creme de cassis, and orange and cranberry juices. An individual container 14 for "Sex on the Beach" may be input to the system as well as a "shot" container 14 that includes a combination of vodka, peach schnapps and crème de cassis. Alternatively, the "Sex on the Beach" container 14 may already include all the components with the exception of vodka, which may be input using a separate shot container 14. Alternatively, separate receptacles 12 for receiving multiple components may be used, or containers 14 may be sized to seat on top of or stacked against each other, with the opening or piercing member piercing through all containers 14 in the receptacle 12 to permit water to flow through each of the containers 14, or for the containers 14 to drain via gravity, to permit multiple different types of alcohol to flow from a single or multiple receptacles 12. For example, a single receptacle 12 could house the "Sex on the Beach" non-alcoholic components while a second single receptacle 12 could house the alcohol components including a peach schnapps container 14, a crème de cassis container 14, and a vodka container 14. The alcohol components could be stacked on top of each other or otherwise arranged in the receptacle 12. The alcohol components could be the same size or different sizes, depending upon what is called for in the drink recipe.

Another type of cocktail that is well known is the "Gin Fizz". A Gin Fizz uses gin, lemon juice, soda water, and gomme syrup. In this example, one receptacle 12 would receive a container 14 of Gin and the other receptacle 12 would receive a mixer container 14 that contains lemon juice and gomme syrup. A separate input can provide the soda water—either added external to the device 10, such as by pouring soda water into the removable cup 16, or via a separate carbonation unit that permits the dispensation of carbonated soda water to the system. Where a separate carbonation system is used, the water may flow from the reservoir into the carbonation system where it is carbonated. Then, carbonated water may either flow through the pouches or containers 14, or flow separately to the cup 16. In one example, uncarbonated water travels through the pouches and containers 14 to dispense them into the cup 16, while soda water travels separately to the cup 16.

Ice dispensing may be provided by an auxiliary device (not shown) that is either integral with or separate from the device 10. The device 10 may include a refrigeration component (not shown) to chill or cool the components rapidly during the dispensing process. The device 10 may include a sensory signal to indicate that the products are being mixed together during dispensation.

The device 10 may include smart technology, such as an RFID chip reader and a processor and/or controller C for directing the operation of the device 10. The containers 14 may include a chip, such as an RFID chip that includes instructions for the device 10 to make the cocktail properly. For example, the chip may include instructions for how much water to add to the contents of the pouch, whether to use plain water or carbonated water, or a combination of both, how much pressure to apply to the contents of the container 14, or other instructions that aid in properly preparing a cocktail. A chip reader reads the instructions from the chip when the container 14 is placed into the receptacle 12. These instructions are then communicated to the processor, which then instructs the various parts of the device 10 to operate according to the instructions. The device 10 may include a processor and/or controller C regardless of whether RFID technology is used to allow for proper operation of the device 10. Other ways, other than RFID technology, may be used to send instructions from the pouch to the processor, as known by those of skill in the art.

Other types of containers 14 or shapes of containers 14 may be used, including those having different openings. Different surfaces of the containers 14 may be pierceable. It may be desirable to have the container 14 opened from two ends, including an upper end and a lower end to permit the flow of water through the container. Alternatively, a single opening could be used.

Various parts of the device 10 can be transparent, including the containers 14, if desired. Advertising material and instructions may be positioned on the containers 14 and on the devices 10.

The term "substantially," if used herein, is a term of estimation.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A pouch for use in a beverage dispenser comprising:

a soft pouch having liquid or slurry contents stored in at least one compartment thereof and having a shape and size to seat in a receptacle of a beverage dispenser to allow opening of the pouch within the dispenser such that the contents of the pouch may be evacuated, the pouch consisting essentially of a front panel, a rear panel, and a singular base panel, with the front and the rear panels being joined directly to one another by a common seal around their side edges and an upper edge thereof to form a single continuous upper rim, the pouch having a width defined between the side edges, the pouch having an upper portion that is bounded by the upper edge and that includes a top edge, upper side edges and rounded shoulders, with the rounded shoulders connected to the side edges of the front and rear panels, and the upper side edges positioned between the shoulders and the top edge, with the top edge having a top edge width that is narrower than the pouch width; and the entire rim of the pouch remains intact prior to use and when inserted into the beverage dispenser.

2. The pouch of claim 1, wherein the top edge is flat.

3. The pouch of claim 1, wherein at least part of the upper side edges have a width that is substantially equal to or less than the width of the top edge.

4. The pouch of claim 1, wherein the upper side edges have an indented portion that is narrower than the width of the top edge.

5. The pouch of claim 1, wherein the front panel, the rear panel, and the base panel are made of a laminated material that is a combination of PET, foil, and polyethylene.

6. The pouch of claim 1, wherein the pouch has a length, a width, and a bottom edge, and the length is greater than the width, and the bottom edge is substantially flat.

7. The pouch of claim 1, further comprising a bottom rim that is formed by the joining together of a bottom edge of the front panel, a bottom edge of the rear panel, and an outer edge of the base panel.

8. The pouch of claim 1, wherein the pouch is bottle shaped.

9. The pouch of claim 1, wherein the compartment extends between the base wall and into the upper portion.

10. The pouch of claim 1, wherein the compartment is positioned between the upper side edges at an upper end of the pouch to the base wall.

11. A method for making a beverage using a beverage dispenser and the pouch of claim 1 comprising:

depositing the pouch having a liquid or a slurry content into a receiving receptacle of the beverage dispenser by inserting the top end of the pouch into the receiving receptacle; and engaging a cutting mechanism that is positioned inside the beverage dispenser to cut through at least a part of the front panel and/or the rear second panel of the pouch to permit the contents of the pouch to at least in part exit the pouch and drain into a receptacle.

12. The method of claim 11, wherein the pouch is substantially completely evacuated via gravity after engaging with the cutting mechanism.

13. The pouch of claim 1, wherein the first, second, front, rear and base panels are made of a laminated material.

14. The pouch of claim 1, wherein the base panel is directly connected to the front and rear panels via a common seal around the base panel.

15. A pouch for use in a beverage dispenser consisting essentially of:

a first layer on a front side of the pouch and a second layer on a rear side of the pouch sealed only to one another around an outer periphery thereof to form a common rim around an upper edge and side edges thereof, a base layer defining a bottom of the pouch and coupled to the bottom edges of the first layer and the second layer via a common seal forming a bottom edge of the pouch at a bottom end thereof, said first, second, and base layers together forming a cavity therebetween, said pouch being a soft pouch made entirely of a flexible, sliceable laminated material for holding a liquid or slurry content, with said pouch having a top end opposite the bottom end; and an opening area on one or both of the first and second layers that is configured to permit a cutting blade to slice through opening area of the first and/or second panels and optionally the top end of the pouch to permit the contents to be substantially completely evacuated from the pouch via gravity, wherein, in use, an intact pouch is inserted into the beverage dispenser.

16. The pouch of claim 15, wherein the rim is formed via sealing around the entire outer periphery of the pouch.

17. The pouch of claim 15, wherein the opening area is defined on at least one of the first and second panels that accepts a cutting blade to open the pouch, and the opening area is soft, flexible, and sliceable.

18. The pouch of claim 15, wherein one or both of:

the opening area comprises less than one half of the length of the pouch; and the opening area comprises an area that is less than one half a width of the pouch.

19. The pouch of claim 15, wherein the pouch has a length and a width, and the length is greater than the width, and the pouch is configured to seat in a beverage dispenser lengthwise such that the length extends vertically permitting a cutting mechanism to slice through the opening area and the contents of the pouch can evacuate the pouch via gravity.

* * * * *